United States Patent
Ding et al.

(10) Patent No.: US 12,120,607 B2
(45) Date of Patent: Oct. 15, 2024

(54) POWER CONTROL METHOD AND APPARATUS, AND DEVICE

(71) Applicant: HUAWEI TECHNOLOGIES CO., LTD., Shenzhen (CN)

(72) Inventors: Zhenghu Ding, Shanghai (CN); Yongmei Zeng, Shanghai (CN); Jiang Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 352 days.

(21) Appl. No.: 17/697,251

(22) Filed: Mar. 17, 2022

(65) Prior Publication Data

US 2022/0210732 A1   Jun. 30, 2022

Related U.S. Application Data

(63) Continuation of application No. PCT/CN2019/106869, filed on Sep. 20, 2019.

(51) Int. Cl.
   *H04W 52/00*   (2009.01)
   *H04W 52/02*   (2009.01)

(52) U.S. Cl.
   CPC ............... *H04W 52/0206* (2013.01)

(58) Field of Classification Search
   CPC .................................................. H04W 52/0206
   See application file for complete search history.

(56) References Cited

U.S. PATENT DOCUMENTS

2011/0164595 A1*  7/2011  So .................. H04W 12/06
                                                                370/338

FOREIGN PATENT DOCUMENTS

| CN | 102238757 A | 11/2011 |
|---|---|---|
| CN | 103595519 A | 2/2014 |
| CN | 107318151 A | 11/2017 |
| CN | 109756955 A | 5/2019 |
| WO | 2011147450 A1 | 12/2011 |
| WO | 2015198269 A1 | 12/2015 |
| WO | 2018138854 A1 | 8/2018 |

OTHER PUBLICATIONS

Extended European Search Report issued in corresponding European Application No. 19945523.9, dated Aug. 1, 2022, pp. 1-25.
Chinese Office Action issued in corresponding Chinese Application No. 201980099631.4, dated Oct. 30, 2023, pp. 1-6.
International Search Report issued in corresponding International Application No. PCT/CN2019/106869, dated Jan. 23, 2020, pp. 1-8.

* cited by examiner

*Primary Examiner* — Erika A Washington
(74) *Attorney, Agent, or Firm* — HAUPTMAN HAM, LLP

(57) ABSTRACT

A power control method and apparatus, and a device. The method includes: determining, by a network device, whether there is to-be-received uplink data in a first scheduling period on a first receive channel; and in response to determining that there is no to-be-received uplink data in the first scheduling period on the first receive channel, controlling, by the network device, a state of the first receive channel in the first scheduling period to be an off state. This reduces power consumption of the network device.

20 Claims, 12 Drawing Sheets

POWER CONTROL METHOD AND APPARATUS, AND DEVICE

CROSS-REFERENCE TO RELATED APPLICATIONS

This application is a continuation of International Application No. PCT/CN2019/106869, filed on Sep. 20, 2019, the disclosure of which is hereby incorporated by reference in its entirety.

BACKGROUND

Currently, a continuous increase in power consumption of a mobile communication network accompanies a continuous increase in performance and efficiency of mobile communication.

Network devices (for example, base stations) account for a main proportion of power consumption of a wireless communication network. In a relevant technology, transmit channels of a network device are usually turned off at intervals to reduce power consumption of the network device. In a conventional network device, because power consumption of transmit channels accounts for a relatively large proportion of total power consumption of the network device, the power consumption of the network device is effectively reduced by turning off the transmit channels at intervals. However, when the power consumption of the transmit channels accounts for a relatively small proportion of the total power consumption of the network device, the power consumption of the network device is unable to be effectively reduced by turning off the transmit channels at intervals.

SUMMARY

Embodiments of this application provide a power control method and apparatus, and a device, to reduce power consumption of a base station.

According to a first aspect, an embodiment of this application provides a power control method. A network device determines whether there is to-be-received uplink data in a first scheduling period on a first receive channel; and if determining that there is no to-be-received uplink data in the first scheduling period on the first receive channel, the network device controls a state of the first receive channel in the first scheduling period to be an off state.

In the foregoing process, for any first receive channel in the network device, when the network device determines that there is no to-be-received uplink data in the first scheduling period on the first receive channel, the network device controls a state of the first receive channel in the first scheduling period to be an off state. When the receive channel is in the off state, power consumption of a device in the receive channel is reduced, and further, power consumption of the network device is reduced.

In a possible implementation, the first receive channel includes a receive end and a low noise amplifier, and the network device is able to control the state of the first receive channel in the first scheduling period to be the off state in the following manner: Before the first scheduling period starts, the network device controls the receive end and/or the low noise amplifier to be turned off.

In the foregoing process, after the network device controls the receive end and/or the low noise amplifier to be turned off, power consumption of the first receive channel is reduced, and further, the power consumption of the network device is reduced.

In a possible implementation, the network device is a baseband unit BBU, and the network device is able to control, in the following manners, the receive end and/or the low noise amplifier to be turned off:

In one manner, the BBU sends first information to a processing chip, where the first information is used to indicate the processing chip to turn off the receive end and/or the low noise amplifier. In this manner, the BBU sends the first information to the processing chip, and the processing chip is able to turn off the receive end and/or the low noise amplifier based on the first information. In other words, the BBU is able to perform unified control on the receive end and/or the low noise amplifier by using the processing chip, thereby providing a simple manner of controlling the receive end and/or the low noise amplifier.

In another manner, the BBU sends second information to the receive end and/or the low noise amplifier, where the second information is used to indicate the receive end and/or the low noise amplifier to set a state to an off state. In this manner, the BBU separately sends the second information to the receive end and/or the low noise amplifier, to separately control the receive end and/or the low noise amplifier, thereby providing relatively high flexibility in controlling the receive end and/or the low noise amplifier.

In a possible implementation, before the network device determines whether there is to-be-received uplink data in the first scheduling period on the first receive channel, the network device performs aggregation scheduling on to-be-received uplink data that is on the first receive channel, where aggregation scheduling is used to schedule uplink data that is in at least one scheduling period to another scheduling period.

In the foregoing process, scheduling periods in an idle state are increased by performing aggregation scheduling on the to-be-received uplink data that is on the first receive channel, so that the first receive channel is turned off in more scheduling periods, thereby reducing the power consumption of the first receive channel and further reducing the power consumption of the network device.

In a possible implementation, the first receive channel corresponds to a single carrier, and the network device is able to perform, in the following manner, aggregation scheduling on the to-be-received uplink data that is on the first receive channel: The network device determines whether first uplink data in a second scheduling period on the single carrier is delayed to a third scheduling period; and if the first uplink data in the second scheduling period on the single carrier is delayed to the third scheduling period, the network device schedules the first uplink data to the third scheduling period, where the third scheduling period follows the second scheduling period.

In the foregoing process, when determining that the first uplink data in the second scheduling period on the single carrier is delayed to the third scheduling period, the network device schedules the first uplink data to the third scheduling period, and repeats the foregoing process in the third scheduling period, that is, data in the third scheduling period is able to be scheduled to another scheduling period. Scheduling periods in an idle state is increased by repeating the foregoing process, so that the first receive channel is turned off in more scheduling periods, thereby reducing the power consumption of the first receive channel and further reducing the power consumption of the network device. In addition, the scheduling manner is simple, enabling aggregation scheduling of relatively low complexity.

In a possible implementation, when the following conditions are met, a determination is made that the to-be-received first uplink data in the second scheduling period on the single carrier is delayed to the third scheduling period:
  a service priority corresponding to the first uplink data is less than or equal to a preset service priority;
  if there is an initial transmission bearer in the first uplink data, a priority of the initial transmission bearer is less than or equal to a preset bearer priority;
  a delay of the first uplink data relative to the third scheduling period is less than or equal to a preset delay; and
  a sum of a quantity of resources occupied by the first uplink data and a quantity of resources occupied by uplink data that is in the third scheduling period on the single carrier is less than or equal to a preset resource quantity.

In the foregoing aggregation scheduling process, aggregation scheduling is performed on the uplink data of a relatively low service priority, and when aggregation scheduling is performed, reference is made to the delay of the first uplink data and the amount of resources occupied by the first uplink data. Therefore, precise aggregation scheduling is performed on the first uplink data, preventing aggregation scheduling from causing excessive impact on a service delay. In addition, by using the foregoing method, aggregation scheduling is performed on uplink data that is in a plurality of scheduling periods, to increase scheduling periods that are in an idle state, so that the first receive channel is turned off in more scheduling periods, thereby reducing the power consumption of the first receive channel and further reducing the power consumption of the network device.

In a possible implementation, the third scheduling period is adjacent to the second scheduling period. In this implementation, a scheduling period that is adjacent to and follows the second scheduling period is determined as the third scheduling period. A manner of determining the third scheduling period is simple, enabling aggregation scheduling of low complexity.

In a possible implementation, there is to-be-received second uplink data in the third scheduling period. In this implementation, because there is the to-be-received second uplink data in the third scheduling period, data in a plurality of scheduling periods is aggregated into one scheduling period after the first uplink data is scheduled to the third scheduling period, thereby effectively increasing scheduling periods that are in an idle state.

In a possible implementation, the first receive channel corresponds to at least two carriers, and the network device is able to perform, in the following manner, aggregation scheduling on the to-be-received uplink data corresponding to the first receive channel: The network device performs aggregation scheduling on uplink data that corresponds to at least one of the at least two carriers, where aggregation scheduling is used to schedule uplink data that is in different scheduling periods on the at least two carriers to a same scheduling period.

In the foregoing process, the uplink data that is in different scheduling periods on the at least two carriers is scheduled to a same scheduling period by performing aggregation scheduling on the uplink data that corresponds to the at least one of the at least two carriers, and further, scheduling periods in an idle state are increased, so that the first receive channel is turned off in more scheduling periods, thereby reducing the power consumption of the first receive channel and further reducing the power consumption of the network device.

In a possible implementation, the network device is able to perform, in the following manner, aggregation scheduling on the uplink data that corresponds to the at least one of the at least two carriers: if uplink data that is in a fourth scheduling period on carriers in a first carrier set is delayed by one scheduling period, scheduling the uplink data that is in the fourth scheduling period on the carriers in the first carrier set to a scheduling period next to the fourth scheduling period, where the first carrier set includes carriers that are of the at least two carriers and on which there is uplink data in the fourth scheduling period.

In the foregoing process, the uplink data that is in the fourth scheduling period on the carriers in the first carrier set is delayed by one scheduling period, and the foregoing process is repeated in the next scheduling period, that is, the data scheduled to the next scheduling period is able to be scheduled to another scheduling period again. Scheduling periods in an idle state is increased by repeating the foregoing process, so that the first receive channel is turned off in more scheduling periods, thereby reducing the power consumption of the first receive channel and further reducing the power consumption of the network device. In addition, the scheduling manner is simple, enabling aggregation scheduling of relatively low complexity.

In a possible implementation, when the following conditions are met, the uplink data that is in the fourth scheduling period on the carriers in the first carrier set is scheduled to the scheduling period next to the fourth scheduling period:
  service priorities corresponding to the uplink data that is in the fourth scheduling period on the carriers in the first carrier set are less than or equal to a preset service priority;
  if the first carrier set has a carrier on which the uplink data in the fourth scheduling period has an initial transmission bearer, a priority of the initial transmission bearer is less than or equal to a preset bearer priority;
  delays, relative to the fourth scheduling period, of the uplink data that is in the fourth scheduling period on the carriers in the first carrier set are less than or equal to a preset delay; and
  a sum of a quantity of resources occupied by the uplink data that is in the fourth scheduling period on the carriers in the first carrier set, and a quantity of resources occupied by uplink data that is in the scheduling period next to the fourth scheduling period on the at least two carriers is less than or equal to a preset resource quantity.

In the foregoing process, aggregation scheduling is performed on the uplink data of a relatively low service priority, and when aggregation scheduling is performed, reference is made to the delay of the first uplink data and the amount of resources occupied by the first uplink data. Therefore, precise aggregation scheduling is performed on the first uplink data, preventing aggregation scheduling from causing excessive impact on a service delay. In addition, by using the foregoing method, aggregation scheduling is performed on uplink data that is in a plurality of scheduling periods, to increase scheduling periods that are in an idle state, so that the receive channel is turned off in more scheduling periods, thereby reducing the power consumption of the receive channel and further reducing the power consumption of the network device.

In a possible implementation, the first receive channel corresponds to at least two carriers, and invalid scheduling periods corresponding to the at least two carriers are in same time domain positions, where the invalid scheduling period is a scheduling period in which uplink data transmission is not performed.

In the foregoing process, by setting invalid scheduling periods for the at least two carriers and ensuring that the invalid scheduling periods corresponding to the at least two carriers are in same time domain positions, aggregation scheduling is performed on uplink data that is in a plurality of scheduling periods, to increase scheduling periods that are in an idle state, so that the receive channel is turned off in more scheduling periods, thereby reducing the power consumption of the receive channel and further reducing the power consumption of the network device.

In a possible implementation, the first receive channel corresponds to at least two carriers, and when scheduling periods corresponding to the at least two carriers are of different duration, the network device further updates duration of a scheduling period of at least one of the at least two carriers, where the updated duration of the scheduling periods corresponding to the at least two carriers is the same. This helps perform aggregation scheduling on uplink data that is on the at least two carriers.

According to a second aspect, an embodiment of this application provides a power control apparatus, applied to a network device. The apparatus includes a determining module and a control module.

The determining module is configured to determine whether there is to-be-received uplink data in a first scheduling period on a first receive channel.

The control module is configured to: when the determining module determines that there is no to-be-received uplink data in the first scheduling period on the first receive channel, control a state of the first receive channel in the first scheduling period to be an off state.

In a possible implementation, the first receive channel includes a receive end and a low noise amplifier, and the control module is configured to:
  before the first scheduling period starts, control the receive end and/or the low noise amplifier to be turned off.

In a possible implementation, the network device is a baseband unit BBU, the apparatus further includes a sending module, and
  the sending module is configured to send first information to a processing chip, where the first information is used to indicate the processing chip to turn off the receive end and/or the low noise amplifier; or
  the sending module is configured to send second information to the receive end and/or the low noise amplifier, where the second information is used to indicate the receive end and/or the low noise amplifier to set a state to an off state.

In a possible implementation, the apparatus further includes a scheduling module.

The scheduling module is configured to: before the determining module determines whether there is to-be-received uplink data in the first scheduling period on the first receive channel, perform aggregation scheduling on to-be-received uplink data that is on the first receive channel, where aggregation scheduling is used to schedule uplink data that is in at least one scheduling period to another scheduling period.

In a possible implementation, the first receive channel corresponds to a single carrier, and the scheduling module is configured to:
  determine whether first uplink data in a second scheduling period on the single carrier is delayed to a third scheduling period; and
  if the first uplink data in the second scheduling period on the single carrier is delayed to the third scheduling period, schedule the first uplink data to the third scheduling period, where the third scheduling period follows the second scheduling period.

In a possible implementation, when the following conditions are met, the scheduling module determines that the to-be-received first uplink data in the second scheduling period on the single carrier is delayed to the third scheduling period:
  a service priority corresponding to the first uplink data is less than or equal to a preset service priority;
  if there is an initial transmission bearer in the first uplink data, a priority of the initial transmission bearer is less than or equal to a preset bearer priority;
  a delay of the first uplink data relative to the third scheduling period is less than or equal to a preset delay; and
  a sum of a quantity of resources occupied by the first uplink data and a quantity of resources occupied by uplink data that is in the third scheduling period on the single carrier is less than or equal to a preset resource quantity.

In a possible implementation, the third scheduling period is adjacent to the second scheduling period; or
  there is to-be-received second uplink data in the third scheduling period.

In a possible implementation, the first receive channel corresponds to at least two carriers, and the scheduling module is configured to:
  perform aggregation scheduling on uplink data that corresponds to at least one of the at least two carriers, where aggregation scheduling is used to schedule uplink data that is in different scheduling periods on the at least two carriers to a same scheduling period.

In a possible implementation, the scheduling module is configured to:
  if uplink data that is in a fourth scheduling period on carriers in a first carrier set is delayed by one scheduling period, schedule the uplink data that is in the fourth scheduling period on the carriers in the first carrier set to a scheduling period next to the fourth scheduling period, where
  the first carrier set includes carriers that are of the at least two carriers and on which there is uplink data in the fourth scheduling period.

In a possible implementation, when the following conditions are met, the scheduling module schedules the uplink data that is in the fourth scheduling period on the carriers in the first carrier set to the scheduling period next to the fourth scheduling period:
  service priorities corresponding to the uplink data that is in the fourth scheduling period on the carriers in the first carrier set are less than or equal to a preset service priority;
  if the first carrier set has a carrier on which the uplink data in the fourth scheduling period has an initial transmission bearer, a priority of the initial transmission bearer is less than or equal to a preset bearer priority;
  delays, relative to the fourth scheduling period, of the uplink data that is in the fourth scheduling period on the carriers in the first carrier set are less than or equal to a preset delay; and a sum of a quantity of resources occupied by the uplink data that is in the fourth scheduling period on the carriers in the first carrier set, and a quantity of resources occupied by uplink data that is in the scheduling period next to the fourth scheduling period on the at least two carriers is less than or equal to a preset resource quantity.

In a possible implementation, the first receive channel corresponds to at least two carriers, and invalid scheduling periods corresponding to the at least two carriers are in same time domain positions, where the invalid scheduling period is a scheduling period in which uplink data transmission is not performed.

In a possible implementation, the first receive channel corresponds to at least two carriers, and the apparatus further includes an updating module.

The updating module is configured to: when scheduling periods corresponding to the at least two carriers are of different duration, update duration of a scheduling period of at least one of the at least two carriers, where the updated duration of the scheduling periods corresponding to the at least two carriers is the same.

According to a third aspect, an embodiment of this application provides a power control apparatus, including a memory and a processor. The memory stores program instructions, and the processor executes the program instructions in the memory and performs the following steps:
determining whether there is to-be-received uplink data in a first scheduling period on a first receive channel; and
if determining that there is no to-be-received uplink data in the first scheduling period on the first receive channel, controlling a state of the first receive channel in the first scheduling period to be an off state.

In a possible implementation, the first receive channel includes a receive end and a low noise amplifier, and the processor is configured to:
before the first scheduling period starts, control the receive end and/or the low noise amplifier to be turned off.

In a possible implementation, a network device is a BBU, the power control apparatus is able to further include a sending module, and
the sending module is configured to send first information to a processing chip, where the first information is used to indicate the processing chip to turn off the receive end and/or the low noise amplifier; or
the sending module is configured to send second information to the receive end and/or the low noise amplifier, where the second information is used to indicate the receive end and/or the low noise amplifier to set a state to an off state.

In a possible implementation, the processor is further configured to: before the processor determines whether there is to-be-received uplink data in the first scheduling period on the first receive channel, perform aggregation scheduling on to-be-received uplink data that is on the first receive channel, where aggregation scheduling is used to schedule uplink data that is in at least one scheduling period to another scheduling period.

In a possible implementation, the first receive channel corresponds to a single carrier, and the processor is configured to:
determine whether first uplink data in a second scheduling period on the single carrier is delayed to a third scheduling period; and
if the first uplink data in the second scheduling period on the single carrier is delayed to the third scheduling period, schedule the first uplink data to the third scheduling period, where the third scheduling period follows the second scheduling period.

In a possible implementation, when the following conditions are met, the processor determines that the to-be-received first uplink data in the second scheduling period on the single carrier is delayed to the third scheduling period:
a service priority corresponding to the first uplink data is less than or equal to a preset service priority;
if there is an initial transmission bearer in the first uplink data, a priority of the initial transmission bearer is less than or equal to a preset bearer priority;
a delay of the first uplink data relative to the third scheduling period is less than or equal to a preset delay; and
a sum of a quantity of resources occupied by the first uplink data and a quantity of resources occupied by uplink data that is in the third scheduling period on the single carrier is less than or equal to a preset resource quantity.

In a possible implementation, the third scheduling period is adjacent to the second scheduling period; or
there is to-be-received second uplink data in the third scheduling period.

In a possible implementation, the first receive channel corresponds to at least two carriers, and the processor is configured to:
perform aggregation scheduling on uplink data that corresponds to at least one of the at least two carriers, where aggregation scheduling is used to schedule uplink data that is in different scheduling periods on the at least two carriers to a same scheduling period.

In a possible implementation, the processor is configured to:
if uplink data that is in a fourth scheduling period on carriers in a first carrier set is delayed by one scheduling period, schedule the uplink data that is in the fourth scheduling period on the carriers in the first carrier set to a scheduling period next to the fourth scheduling period, where
the first carrier set includes carriers that are of the at least two carriers and on which there is uplink data in the fourth scheduling period.

In a possible implementation, when the following conditions are met, the processor schedules the uplink data that is in the fourth scheduling period on the carriers in the first carrier set to the scheduling period next to the fourth scheduling period:
service priorities corresponding to the uplink data that is in the fourth scheduling period on the carriers in the first carrier set are less than or equal to a preset service priority;
if the first carrier set has a carrier on which the uplink data in the fourth scheduling period has an initial transmission bearer, a priority of the initial transmission bearer is less than or equal to a preset bearer priority;
delays, relative to the fourth scheduling period, of the uplink data that is in the fourth scheduling period on the carriers in the first carrier set are less than or equal to a preset delay; and
a sum of a quantity of resources occupied by the uplink data that is in the fourth scheduling period on the carriers in the first carrier set, and a quantity of resources occupied by uplink data that is in the scheduling period next to the fourth scheduling period on the at least two carriers is less than or equal to a preset resource quantity.

In a possible implementation, the first receive channel corresponds to at least two carriers, and invalid scheduling periods corresponding to the at least two carriers are in same time domain positions, where the invalid scheduling period is a scheduling period in which uplink data transmission is not performed.

In a possible implementation, the first receive channel corresponds to at least two carriers, and when scheduling periods corresponding to the at least two carriers are of different duration, the processor is further configured to update duration of a scheduling period of at least one of the at least two carriers, where the updated duration of the scheduling periods corresponding to the at least two carriers is the same.

According to a fourth aspect, an embodiment of this application provides a network device, including the power control apparatus according to any one of the possible implementations of the third aspect.

According to a fifth aspect, an embodiment of this application provides a storage medium. The storage medium is configured to store a computer program, and when being executed by a computer or processor, the computer program is used to implement the power control method according to any one of the possible implementations of the first aspect.

According to a sixth aspect, an embodiment of this application provides a computer program product. The computer program product includes instructions, and when the instructions are executed, a computer is enabled to perform the power control method according to any one of the possible implementations of the first aspect.

According to a seventh aspect, an embodiment of this application provides a system on chip or a system chip. The system on chip or the system chip is able to be used in a terminal device, and the system on chip or the system chip includes at least one communication interface, at least one processor, and at least one memory. The communication interface, the memory, and the processor are interconnected by using a bus, and the processor executes instructions stored in the memory, so that the terminal device is able to perform the power control method according to any one of the possible implementations of the first aspect of this application.

According to the power control method and apparatus and the device provided in the embodiments of this application, for any first receive channel in the network device, the network device determines whether there is to-be-received uplink data in the first scheduling period on the first receive channel; and if determining that there is no to-be-received uplink data in the first scheduling period on the first receive channel, the network device controls the state of the first receive channel in the first scheduling period to be the off state. When the receive channel is in the off state, the power consumption of the device in the receive channel is reduced, and further, the power consumption of the network device is reduced.

DESCRIPTION OF EMBODIMENTS

Figure 1A:
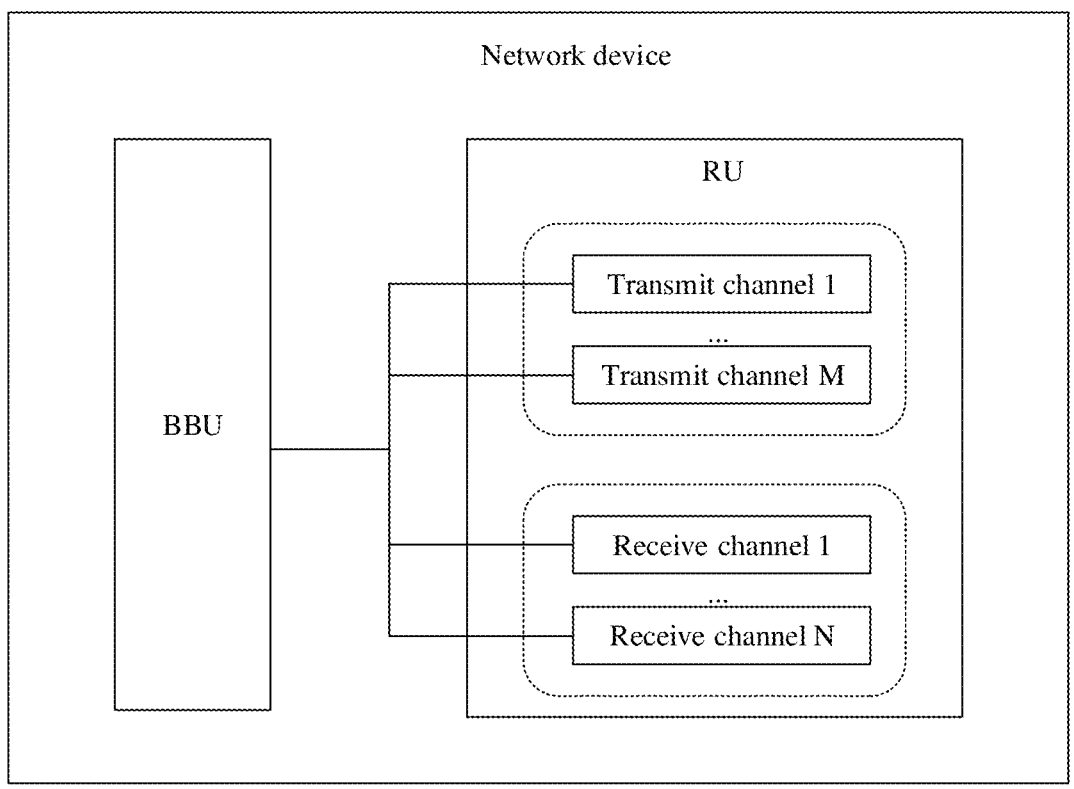
FIG. 1A is a diagram of an architecture of a network device according to an embodiment of this application.

For ease of understanding, concepts in this application are first described.

A terminal device is a device that has a wireless transceiver function. The terminal device is able to be deployed on land, including being deployed indoor, outdoor, handheld, wearable, or in-vehicle; or is able to be deployed on a water surface (for example, on a ship); or is able to be deployed in the air (for example, on an airplane, a balloon, or a satellite). The terminal device is able to be a mobile phone (mobile phone), a tablet computer (Pad), a computer with a wireless transceiver function, a virtual reality (virtual reality, VR for short) terminal device, an augmented reality (augmented reality, AR for short) terminal device, a wireless terminal in industrial control (industrial control), a vehicle-mounted terminal device, a wireless terminal in self driving (self driving), a wireless terminal device in telemedicine (remote medical), a wireless terminal device in a smart grid (smart grid), a wireless terminal device in transportation safety (transportation safety), a wireless terminal device in a smart city (smart city), a wireless terminal device in a smart home (smart home), a wearable terminal device, or the like. The terminal device in the embodiments of this application is able to further be referred to as a terminal, user equipment (user equipment, UE), an access terminal device, a vehicle-mounted terminal, an industrial control terminal, a UE unit, a UE station, a mobile station, a mobile console, a remote station, a remote terminal device, a mobile device, a UE terminal device, a wireless communication device, a UE agent, a UE apparatus, or the like. The terminal device is able to be fixed or movable.

A network device is a device with a wireless transceiver function. The network device includes but is not limited to an evolved NodeB (Evolutional Node B, eNB or eNodeB) in a long term evolution (long term evolution, LTE) system; or the network device is able to be a gNB, a transmission reception point (transmission reception point, TRP), a micro base station, or the like in a 5G communication system; or the network device is able to be a relay station, an access point, a vehicle-mounted device, a wearable device, a network device in a future evolved public land mobile network (Public Land Mobile Network, PLMN), a base station in another network that integrates a plurality of technologies or in other various evolved networks, or the like. The 5G communication system is able to further be referred to as a new radio (new radio, NR) system. For example, the network device is able to be a base station (Base Station, BS). The base station is able to provide a communication service for a plurality of mobile stations (Mobile Stations, MSs), and the base station is able to further be connected to a core network device. The base station includes a baseband unit (Baseband Unit, BBU) and a remote radio unit (English: Remote Radio Unit, RRU). The BBU is able to further be referred to as a network device. Alternatively, the base station is able to include a BBU and an active antenna unit (active antenna unit, AAU). The AAU includes an RRU and an antenna. For example, a device with an RRU and an antenna integrated is able to be referred to as an AAU. The BBU and the RRU is able to be placed at different places. For example, the RRU is remote and placed in a heavy-traffic area, and the BBU is placed in a central equipment room. Alternatively, the BBU and the RRU is able to be placed in a same equipment room. Alternatively, the BBU and the RRU is able to be different components at a same rack.

Figure 1B:
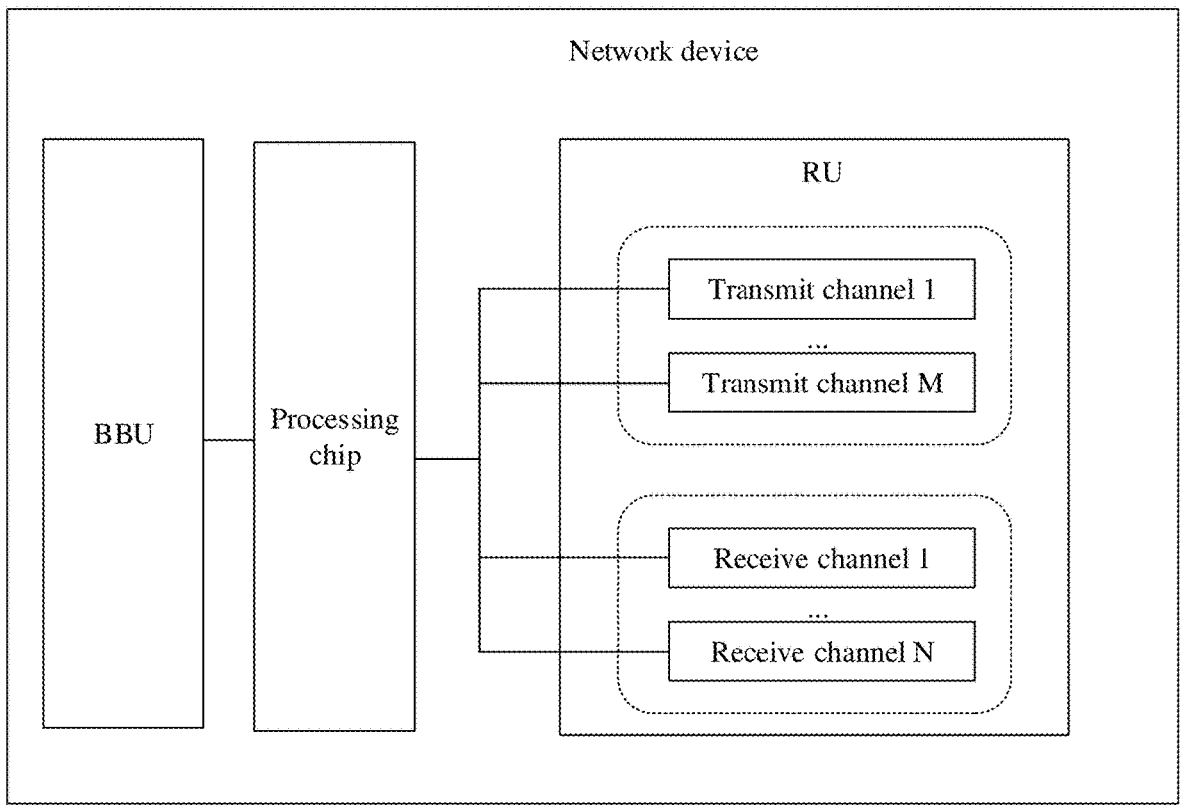
FIG. 1B is a diagram of an architecture of a network device according to an embodiment of this application.

For ease of understanding, the following describes an architecture of a network device with reference to FIG. 1A and FIG. 1B.

FIG. 1A is a diagram of an architecture of a network device according to an embodiment of this application. Refer to FIG. 1A. The network device includes a baseband unit (baseband unit, BBU) and a radio unit (radio unit, RU). The radio unit includes M transmit channels and N receive channels. M is able to be 8, 16, 32, 64, or the like, and N is able to be 8, 16, 32, 64, or the like. The BBU is separately connected to each transmit channel and each receive channel. The BBU is able to schedule uplink data. For example, the BBU is able to perform aggregation scheduling on uplink data, to increase a proportion of idle uplink scheduling periods. The network device is able to send downlink data to a terminal device through a transmit channel, and is able to receive, through a receive channel, uplink data sent by a terminal device. Optionally, the network device is able to further include a common public radio interface (common public radio interface, CPRI) or an evolved common public radio interface (evolution common public radio interface, eCPRI). The BBU is able to be connected to the receive channels and the transmit channels through the CPRI or the eCPRI. The CPRI interface is able to be located in the RU. In this application, the BBU is able to control a state of a receive channel to be an off state or an on state. The receive channel includes one or more devices. States of the device include a power-on state (a state with the device powered on) and a power-off state (a state with the device powered off). When a device in the receive channel is in the power-off state, the state of the receive channel is the off state; and when the devices in the receive channel are in the power-on state, the state of the receive channel is the on state. In the following description in this application, turning off a receive channel means turning off at least one device in the receive channel, turning off a device in a receive channel means powering off the device in the receive channel, and powering off a device in a receive channel is able to further be referred to as setting a state of the device in the receive channel to a power-off state.

FIG. 1B is a diagram of an architecture of a network device according to an embodiment of this application. On a basis of the architecture of the network device shown in FIG. 1A, referring to FIG. 1B, the network device further includes a processing chip. The BBU is connected to the processing chip, and the processing chip is separately connected to each transmit channel and each receive channel. Optionally, the processing chip is able to be located inside or outside the RU. The network device is able to control a state of a receive channel to be an off state or an on state by using the processing chip. Optionally, the network device is able to further include a CPRI. The processing chip is able to be connected to the receive channels and the transmit channels through the CPRI. The CPRI interface is able to be located in the RU.

Figure 2:
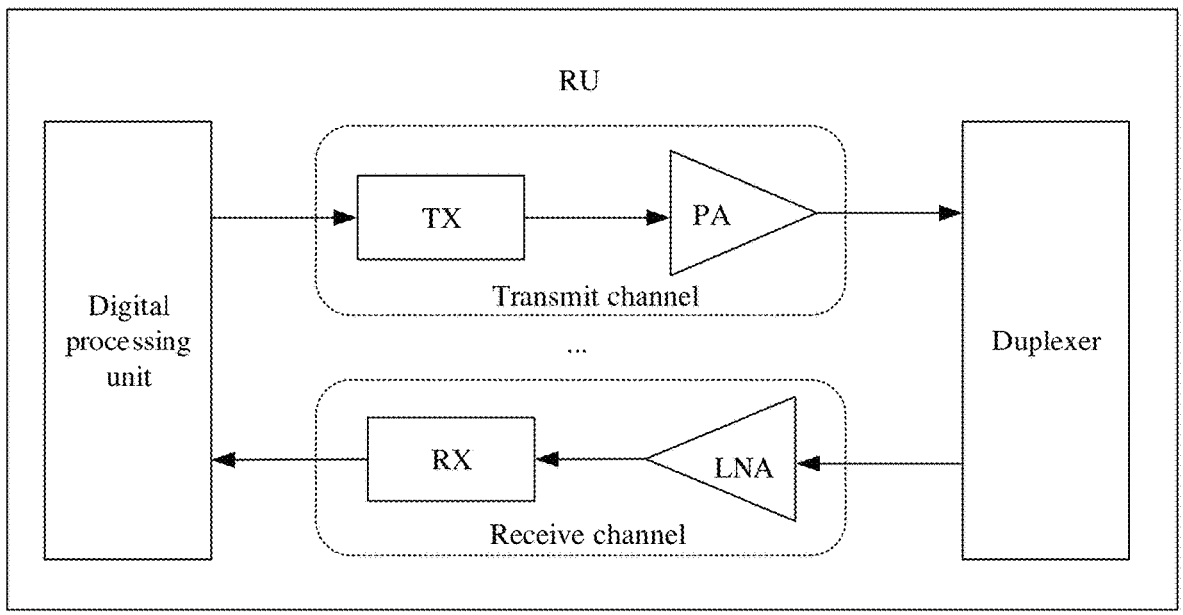
FIG. 2 is a schematic diagram of a structure of an RU according to an embodiment of this application.

On a basis of FIG. 1A and FIG. 1B, the following describes a structure of the RU with reference to FIG. 2. FIG. 2 is a schematic diagram of a structure of an RU according to an embodiment of this application. Refer to FIG. 2. The RU includes the transmit channels, the receive channels, a digital processing unit, and a duplexer. The transmit channel includes a transmit end (transmit end, TX) and a power amplifier (power amplifier, PA). The transmit end is configured to obtain to-be-sent data of the network device and transmit the to-be-sent data to the PA. The PA is able to perform power amplification processing on the to-be-sent data, and transmit the data that undergoes the amplification processing to the duplexer. The receive channel includes a receive end (receive end, RX) and a low noise amplifier (low noise amplifier, LNA). The LNA is able to receive data from the duplexer, perform low noise amplification processing on the received data, and send the data that undergoes the low noise amplification processing to the receive end. The digital processing unit is configured to perform digital intermediate frequency processing. For example, the digital intermediate frequency processing is able to include digital pre-distortion (digital pre-distortion, DPD) processing, crest factor reduction (crest factor reduction, CFR) processing, digital up-conversion (digital up converter, DUC) processing, digital down converter (digital down converter, DDC) processing, and the like. The duplexer is able to enable receive signals and transmit signals to multiplex an antenna system, so that the receive signals and the transmit signals share one antenna channel. The duplexer further provides a filtering function for the receive signals and the transmit signals.

A single-carrier scenario: A scenario in which one carrier is configured for a receive channel in a network device is referred to as a single-carrier scenario. The carrier is able to be an LTE carrier or an NR carrier. Carriers configured for different receive channels in the network device is able to be of a same type or different types. For example, assuming that there are 32 receive channels in the network device, carriers configured for the 32 receive channels is able to be LTE carriers; or carriers configured for the 32 receive channels is able to be NR carriers; or carriers configured for one part of the 32 receive channels are LTE carriers, and carriers configured for the other part of the 32 receive channels are NR carriers.

A multi-carrier scenario: A scenario in which more than one carrier is configured for a receive channel in a network device is referred to as a multi-carrier scenario. The plurality of carriers is able to be LTE carriers; or the plurality of carriers is able to be NR carriers; or one part of the plurality of carriers are LTE carriers, and the other part of the plurality of carriers are NR carriers. When the plurality of carriers are LTE carriers or NR carriers, the multi-carrier scenario is able to be referred to as a multi-carrier single-mode scenario. When one part of the plurality of carriers are LTE carriers and the other part of the plurality of carriers are NR carriers, the multi-carrier scenario is able to further be referred to as a multi-carrier multi-mode scenario. Carrier configurations corresponding to different receive channels in the network device is able to be the same or different. The carrier configurations is able to include a carrier type, a carrier quantity, and the like.

A scheduling period is a period in which uplink data is scheduled. A network device has different scheduling periods in different scenarios (a single-carrier scenario or a multi-carrier scenario). In the single-carrier scenario and a multi-carrier single-mode scenario, a scheduling period is a basic time unit for scheduling in a corresponding system. For example, for an LTE system, a basic time unit for scheduling is able to be a subframe; and for an NR system, a basic time unit for scheduling is able to be a slot. In a multi-carrier multi-mode scenario, a scheduling period is usually the basic time unit for scheduling in the LTE system. The basic time unit for scheduling in the LTE system is usually an integer multiple of the basic time unit for scheduling in the NR system. For example, in the multi-carrier multi-mode scenario, the scheduling period is able to be a subframe.

Figure 3:
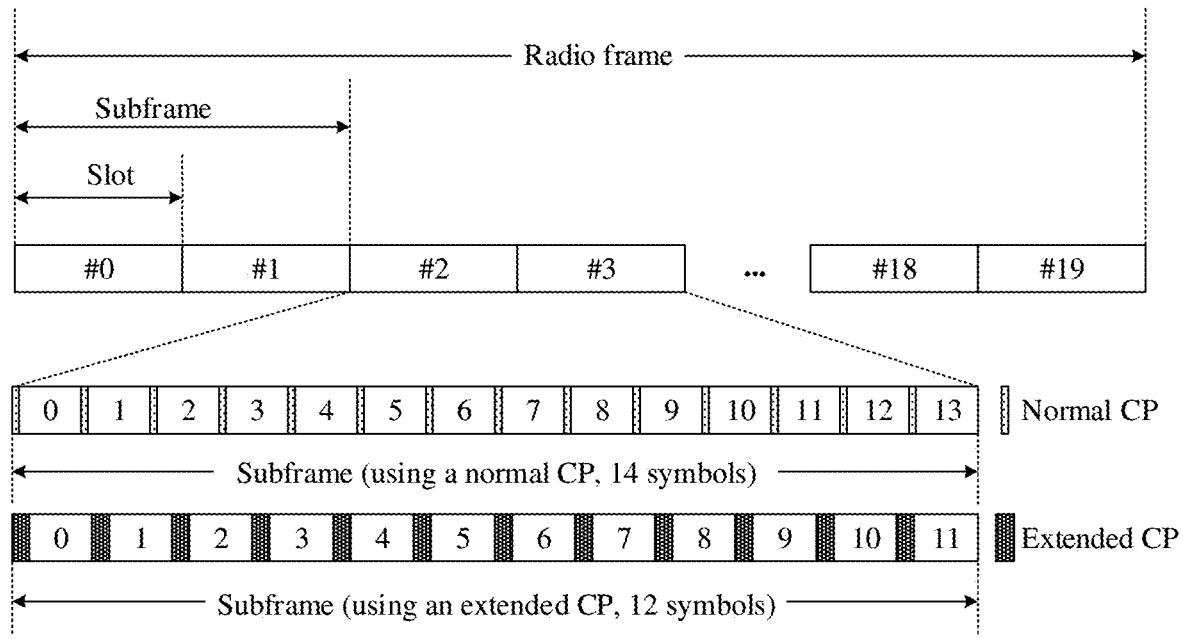
FIG. 3 is a schematic diagram of a structure of a radio frame according to an embodiment of this application.

The following describes the basic time unit with reference to FIG. 3. FIG. 3 is a schematic diagram of a structure of a radio frame according to an embodiment of this application. Refer to FIG. 3. The radio frame includes a plurality of subframes. One subframe is able to include two slots. For a normal cyclic prefix (cyclic prefix), one subframe includes 14 symbols, and for an extended CP, one subframe includes 12 symbols. For example, duration of one radio frame is able to be 10 milliseconds, duration of one subframe is able to be 1 millisecond, and duration of one slot is able to be 0.5 millisecond. FIG. 3 is a schematic diagram illustrating the structure of the radio frame merely in a form of an example, and is not a limitation on the structure of the radio frame. In the LTE system, one subframe is able to include two slots, whereas in the NR system, one subframe is able to further include one slot, two slots, four slots, eight slots, 16 slots, or the like.

Aggregation scheduling: For any receive channel, uplink data in at least one scheduling period on the receive channel is scheduled to another scheduling period on the receive channel. Optionally, there is further to-be-received uplink data in the another scheduling period on the receive channel. In this way, uplink data in at least two scheduling periods is aggregated into one scheduling period, so that idle scheduling periods is increased. For example, aggregation scheduling is able to be as follows: Initially, there is to-be-received uplink data in both a scheduling period 1 and a scheduling period 2 on a receive channel 1. In this case, the uplink data in the scheduling period 1 on the receive channel 1 is able to be scheduled to the scheduling period 2, so that there is no to-be-received uplink data in the scheduling period 1 on the receive channel 1, that is, the scheduling period 1 corresponding to the receive channel 1 is switched to an idle state.

Technical solutions shown in this application is able to be applied to a 5th generation mobile communication technology (5th Generation mobile communication technology, 5G for short) system; or is able to be applied to an LTE system, for example, a vehicle to X (vehicle to X, V2X) system, a device to device (device to device, D2D) system, a machine type communication (machine type communication, MTC) system, or the like in an LTE communication system; or is able to be applied to a universal mobile telecommunications system (universal mobile telecommunications system, UMTS) terrestrial radio access network (UMTS terrestrial radio access network, UTRAN) system, or a global system for mobile communications (global system for mobile communication, GSM)/enhanced data rates for GSM evolution (enhanced data rate for GSM evolution, EDGE) radio access network (GSM EDGE radio access network, GERAN) architecture. The technical solutions shown in this application is able to further be applied to other communication systems, for example, an evolved communication system of the 5G system. This is not limited in this application.

Figure 4:
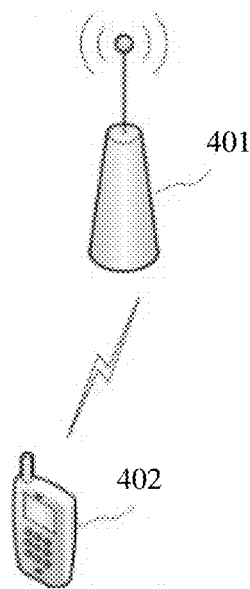
FIG. 4 is a schematic diagram of a possible communication scenario according to an embodiment of this application.

With reference to FIG. 4, the following describes a scenario to which a communication method in this application is applicable.

FIG. 4 is a schematic diagram of a possible communication scenario according to an embodiment of this application. Refer to FIG. 4. A network device 401 and a terminal device 402 are included. The network device 401 and the terminal device 402 is able to interact with each other. The network device 401 is able to receive, through a receive channel, uplink data sent by the terminal device 402, and is able to send downlink data to the terminal device 402 through a transmit channel. The network device 401 is able to set the receive channel to be in an off state or an on state based on the uplink data sent by the terminal device. When the receive channel is in the off state, power consumption of a device in the receive channel is reduced, and further, power consumption of the network device is reduced.

FIG. 4 illustrates a scenario merely in a form of an example. The method shown in this application is able to further be applied to another communication scenario. For example, the another communication scenario is able to include more network devices and/or more terminal devices. An applicable communication scenario is not limited in the embodiments of this application.

The following describes, by using specific embodiments, a power control method shown in this application. The following several embodiments are used in combination. Same or similar content is not repeated in different embodiments.

Figure 5:
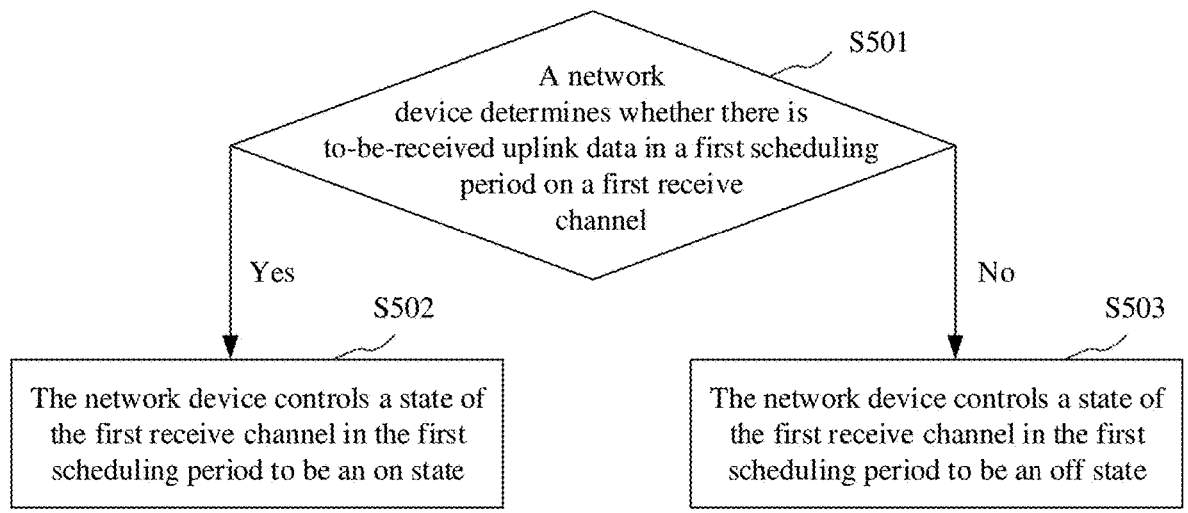
FIG. 5 is a schematic flowchart of a power control method according to an embodiment of this application.

FIG. 5 is a schematic flowchart of a power control method according to an embodiment of this application. Refer to FIG. 5. The method is able to include the following steps.

S501. A network device determines whether there is to-be-received uplink data in a first scheduling period on a first receive channel.

If yes, S502 is performed.

If no, S503 is performed.

The first receive channel is any receive channel in the network device. For example, the first receive channel is able to be any receive channel in an RU in the network device.

The first scheduling period is able to be a scheduling period that follows a current scheduling period. For example, the first scheduling period is able to be a scheduling period next to the current scheduling period.

The network device schedules uplink data sent by a terminal device. For example, the network device is able to schedule a time domain resource (where the time domain resource has a correspondence with a scheduling period) used by the terminal device when the terminal device sends the uplink data. Therefore, the network device is able to learn of a scheduling period in which a terminal device within a scheduling range of the network device sends uplink data.

S502. The network device controls a state of the first receive channel in the first scheduling period to be an on state.

If a state of the first receive channel in the current scheduling period is the on state, the network device is able to not change a state of a device in the first receive channel. When the state of the first receive channel is the on state, states of devices in the first receive channel are power-on states. The device included in the first receive channel is able to be a receive end and an LNA.

If a state of the first receive channel in the current scheduling period is an off state, the network device sets the state of the first receive channel to the on state before the first scheduling period starts. When the state of the first receive channel is the off state, a state of at least one device in the first receive channel is a power-off state. In this case, the network device is able to set a state of a device that is in the first receive channel and that is in the power-off state to a power-on state, thereby setting the state of the first receive channel to the on state. Optionally, when an architecture of the network device is shown in FIG. 1A, a BBU is able to send a third message to the device that is in the first receive channel and that is in the power-off state, so that the device in the power-off state is powered on based on the third message. When an architecture of the network device is shown in FIG. 1B, a BBU is able to send a fourth message to a processing chip, and the processing chip controls, based on the fourth message, the device that is in the first receive channel and that is in the power-off state to be powered on.

S503. The network device controls a state of the first receive channel in the first scheduling period to be an off state.

If a state of the first receive channel in the current scheduling period is the off state, the network device is able to not change a state of a device in the first receive channel. When the state of the first receive channel is the off state, states of devices in the first receive channel are power-off states.

If a state of the first receive channel in the current scheduling period is an on state, the network device sets the state of the first receive channel to the off state before the first scheduling period starts. When the state of the first receive channel is the on state, states of devices in the first receive channel are power-on states. In this case, the network device is able to set a state of at least one device that is in the first receive channel to a power-off state. In other words, the network device is able to turn off the at least one device that is in the first receive channel, so that the state of the at least one device in the first receive channel is switched to the power-off state. When an architecture of the network device is shown in FIG. 1A, a BBU is able to send second information to a receive end and/or a low noise amplifier that is in the first receive channel, so that the receive end and/or the low noise amplifier is powered off. When an architecture of the network device is shown in FIG. 1B, a BBU sends first information to a processing chip, to indicate the processing chip to turn off a receive end and/or a low noise amplifier.

According to the power control method provided in this embodiment of this application, for any first receive channel in the network device, the network device determines whether there is to-be-received uplink data in the first scheduling period on the first receive channel; and if determining that there is no to-be-received uplink data in the first scheduling period on the first receive channel, the network device controls the state of the first receive channel in the first scheduling period to be the off state. When the receive channel is in the off state, power consumption of the device in the receive channel is reduced, and further, power consumption of the network device is reduced.

On a basis of any one of the foregoing embodiments, to further reduce the power consumption of the network device, the network device is able to further perform aggregation scheduling on uplink data, so that there is no uplink data in more scheduling periods, and further, the receive channel is in the off state in more scheduling periods. When application scenarios (a single-carrier scenario or a multi-carrier scenario) are different, processes of performing aggregation scheduling on uplink data are further different. The following separately describes processes in which the network device performs aggregation scheduling on uplink data in different application scenarios. The network device is able to perform aggregation scheduling on uplink data in any quantity of scheduling periods. The following uses a process in which the network device performs aggregation scheduling on uplink data in any scheduling period as an example for description.

In the single-carrier scenario, aggregation scheduling is able to be performed on uplink data in the following two feasible implementations. The following uses a process of scheduling to-be-received uplink data that is on any receive channel as an example for description.

In a feasible implementation:

The network device sets invalid scheduling periods and valid scheduling periods in a plurality of scheduling periods. The invalid scheduling period is a period in which uplink data transmission is not performed, whereas the valid scheduling period is a period in which uplink data transmission is performed. To be specific, the network device does not receive uplink data in the invalid scheduling periods, and is able to receive uplink data in the valid scheduling periods. When scheduling uplink data, the network device schedules the uplink data to a valid scheduling period for transmission. For example, the network device is able to schedule the uplink data to a valid scheduling period closest to a current moment for transmission.

Invalid scheduling periods and valid scheduling periods are set at intervals. The following describes possible scheduling period settings with reference to FIG. 6A to FIG. 6C.

Figure 6A:
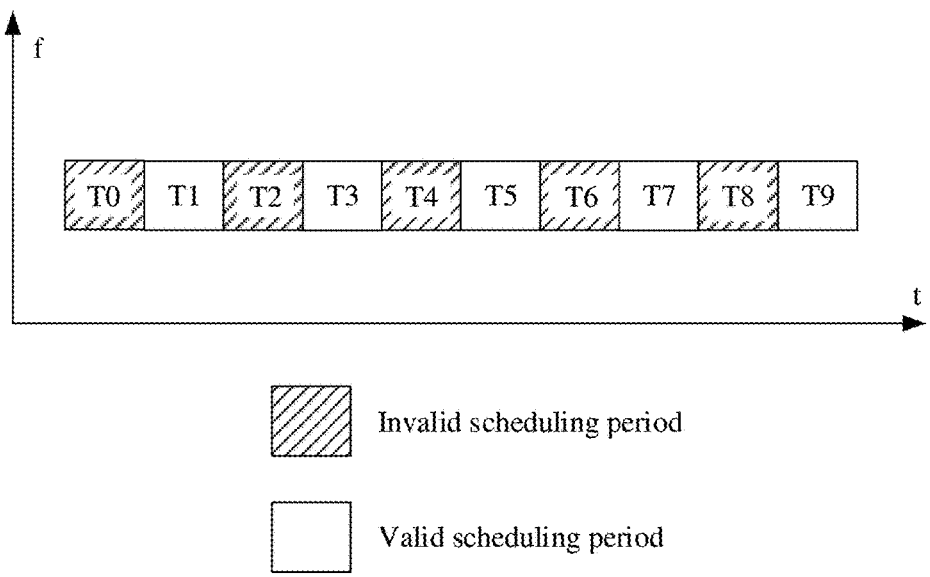
FIG. 6A is a schematic diagram of a scheduling period according to an embodiment of this application.

FIG. 6A is a schematic diagram of a scheduling period according to an embodiment of this application. Refer to FIG. 6A. T0, T2, T4, T6, and T8 are invalid scheduling periods, and T1, T3, T5, T7, and T9 are valid scheduling periods. The invalid scheduling periods and the valid scheduling periods are set at equal intervals. For example, when a terminal device has to-be-sent uplink data in the scheduling period T0, a network device schedules the uplink data to the scheduling period T1, and when the terminal device has to-be-sent uplink data in the scheduling period T2, the network device schedules the uplink data to the scheduling period T3.

Figure 6B:
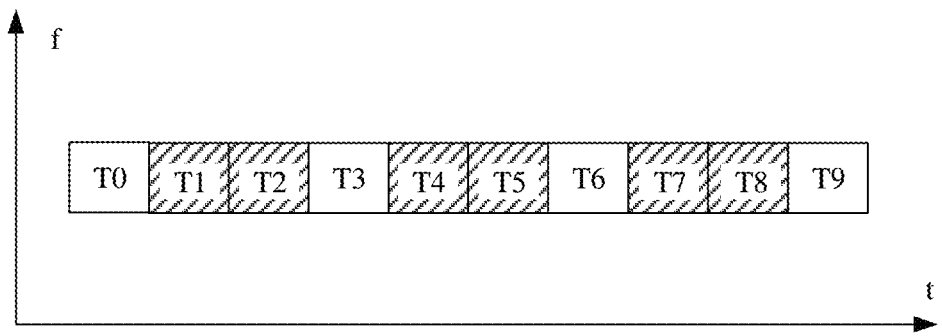
FIG. 6B is a schematic diagram of another scheduling period according to an embodiment of this application.

FIG. 6B is a schematic diagram of another scheduling period according to an embodiment of this application. Refer to FIG. 6B. T0, T3, T6, and T9 are invalid scheduling periods, and T1, T2, T4, T5, T7, and T8 are valid scheduling periods. The invalid scheduling periods and the valid scheduling periods are set at unequal intervals. For example, when a terminal device has to-be-sent uplink data in the scheduling period T1 or T2, a network device schedules the uplink data to the scheduling period T3, and when the terminal device has to-be-sent uplink data in the scheduling period T4 or T5, the network device schedules the uplink data to the scheduling period T6.

Figure 6C:
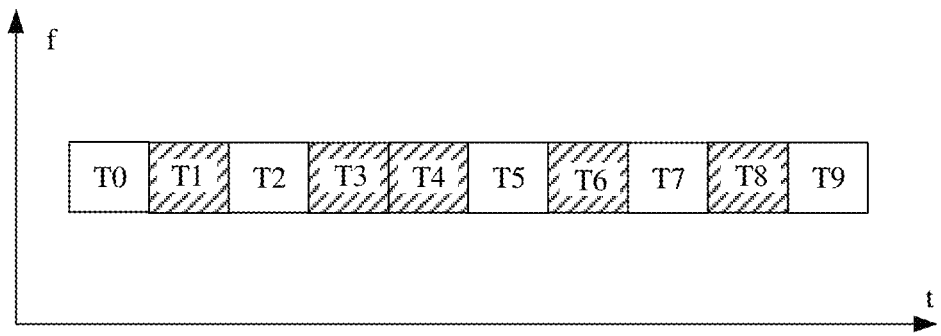
FIG. 6C is a schematic diagram of still another scheduling period according to an embodiment of this application.

FIG. 6C is a schematic diagram of still another scheduling period according to an embodiment of this application. Refer to FIG. 6C. T1, T3, T4, T6, and T8 are invalid scheduling periods, and T0, T2, T5, T7, and T9 are valid scheduling periods. The invalid scheduling periods and the valid scheduling periods are set at unequal intervals. For example, when a terminal device has to-be-sent uplink data in the scheduling period T1, a network device schedules the uplink data to the scheduling period T2, and when the terminal device has to-be-sent uplink data in the scheduling period T3 or T4, the network device schedules the uplink data to the scheduling period T5.

FIG. 6A to FIG. 6C illustrate setting of invalid scheduling periods and valid scheduling periods merely in a form of an example, and are not limitations on setting of invalid scheduling periods and valid scheduling periods. In an actual application process, valid scheduling periods and invalid scheduling periods are set according to an actual parameter. For example, when there is a relatively large amount of uplink data, more valid scheduling periods are set, whereas when there is a relatively small amount of uplink data, fewer valid scheduling periods are set. In the actual application process, setting of valid scheduling periods and invalid scheduling periods are further adjusted according to an actual parameter. For example, setting of valid scheduling periods and setting of invalid scheduling periods are different in different time periods. Setting of valid scheduling periods and invalid scheduling periods is not limited in the embodiments of this application.

In this implementation, by setting invalid scheduling periods, aggregation scheduling is performed on uplink data that is in a plurality of scheduling periods, to increase scheduling periods that are in an idle state, so that the receive channel is turned off in more scheduling periods, thereby reducing power consumption of the receive channel and further reducing the power consumption of the network device.

In another feasible implementation:

The network device determines whether first uplink data in a second scheduling period on a single carrier is delayed to a third scheduling period; and if the first uplink data in the second scheduling period on the single carrier is delayed to the third scheduling period, the network device schedules the first uplink data to the third scheduling period, where the third scheduling period follows the second scheduling period.

The second scheduling period is able to be a scheduling period that the network device allocates to the first uplink data when initially scheduling the first uplink data. In other words, when the terminal device requests to transmit the first uplink data, the scheduling period allocated by the network device to the first uplink data is the second scheduling period.

The second scheduling period is able to alternatively be a scheduling period that the network device allocates to the first uplink data after performing aggregation scheduling on the first uplink data for at least one time. For example, after the terminal device requests to transmit the first uplink data, the network device allocates a scheduling period (not the second scheduling period) to the first uplink data; and after performing aggregation scheduling for one or more times, the network device allocates the second scheduling period to the first uplink data.

When the following conditions are met, a determination is made that the to-be-received first uplink data in the second scheduling period on the single carrier is delayed to the third scheduling period:

Condition 1: A service priority corresponding to the first uplink data is less than or equal to a preset service priority.

Condition 2: If there is an initial transmission bearer in the first uplink data, a priority of the initial transmission bearer is less than or equal to a preset bearer priority.

Condition 3: A delay of the first uplink data relative to the third scheduling period is less than or equal to a preset delay. The delay of the first uplink data relative to the third scheduling period is duration between a moment at which the terminal device requests to send the first uplink data and the third scheduling period.

Condition 4: A sum of a quantity of resources occupied by the first uplink data and a quantity of resources occupied by uplink data that is in the third scheduling period on the single carrier is less than or equal to a preset resource quantity. The uplink data that is in the third scheduling period on the single carrier is uplink data that has been determined, before current aggregation scheduling is performed, to be sent in the third scheduling period.

The foregoing describes, merely in a form of an example, conditions used for determining that the first uplink data is delayed to the third scheduling period. In an actual application process, the conditions are set according to an actual parameter. This is not limited in the embodiments of this application.

Optionally, the third scheduling period is adjacent to the second scheduling period. To be specific, the third scheduling period is a scheduling period next to the second scheduling period. Alternatively, there is to-be-received second uplink data in the third scheduling period. To be specific, the third scheduling period is a scheduling period that follows the second scheduling period and that has to-be-received uplink data. For example, the third scheduling period is able to be a scheduling period that follows the second scheduling period, has to-be-received uplink data, and is closest to the second scheduling period.

Figure 7A:
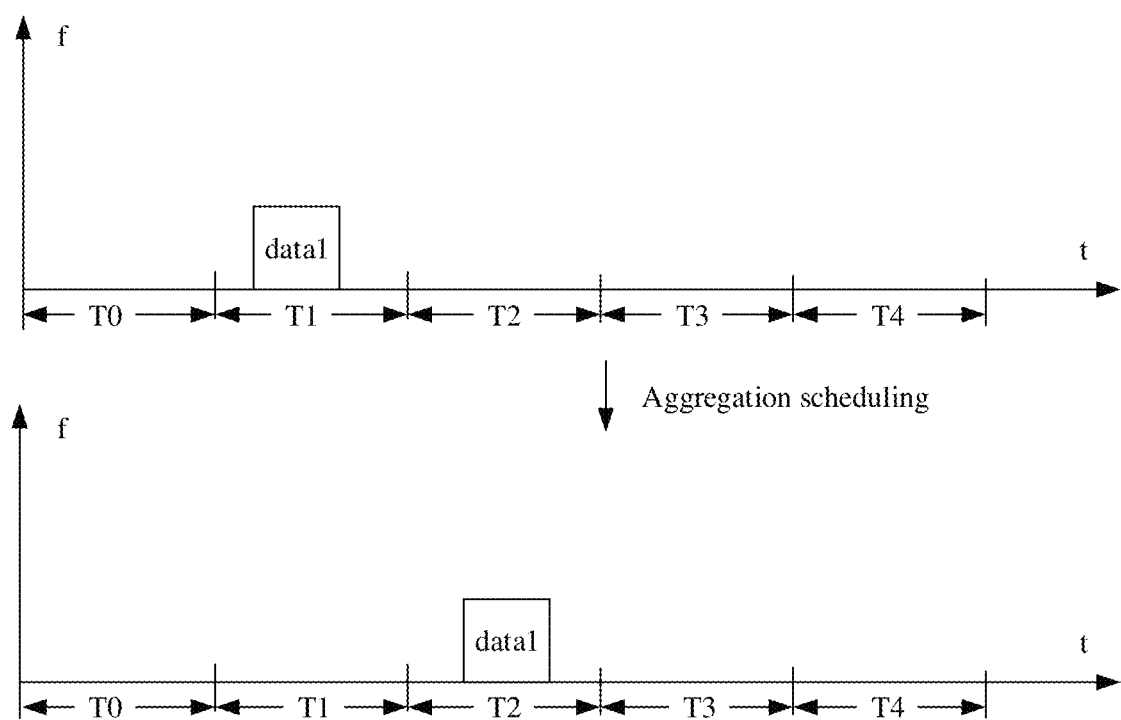
FIG. 7A is a schematic diagram of an aggregation scheduling process according to an embodiment of this application.
Figure 7B:
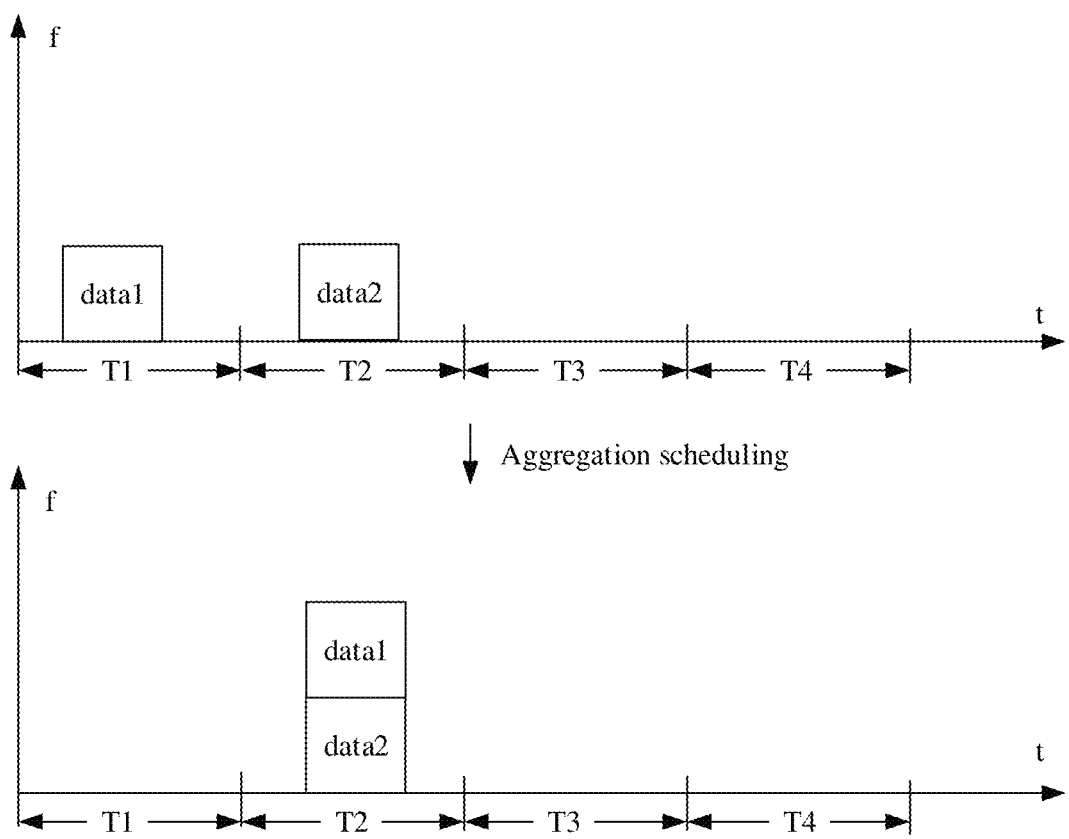
FIG. 7B is a schematic diagram of another aggregation scheduling process according to an embodiment of this application.
Figure 7C:
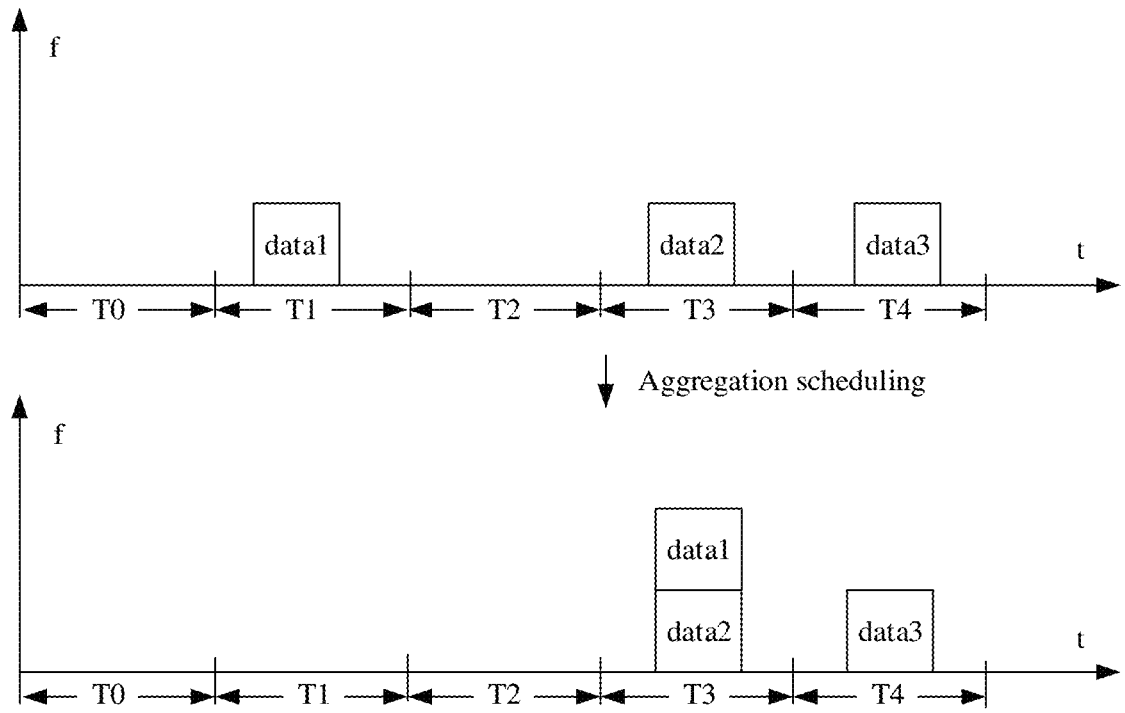
FIG. 7C is a schematic diagram of still another aggregation scheduling process according to an embodiment of this application.

The following describes aggregation scheduling processes with reference to FIG. 7A to FIG. 7C.

FIG. 7A is a schematic diagram of an aggregation scheduling process according to an embodiment of this application. A third scheduling period is a scheduling period next to a second scheduling period. Refer to FIG. 7A. Assuming that a current scheduling period is T0 and the second scheduling period is T1, a determination is made that the third scheduling period is T2, because the third scheduling period is a scheduling period next to the second scheduling period. Before aggregation scheduling is performed, there is to-be-received first uplink data data1 in the second scheduling period T1, and there is no to-be-received uplink data in the third scheduling period T2. After determining that the first uplink data data1 is scheduled from the second scheduling period T1 to the second scheduling period T2, a network device schedules the first uplink data data1 from the second scheduling period T1 to the third scheduling period T2. After the aggregation scheduling is completed, there is no to-bereceived uplink data in the second scheduling period T1, and there is the to-be-received first uplink data data1 in the third scheduling period T2.

FIG. 7B is a schematic diagram of another aggregation scheduling process according to an embodiment of this application. A third scheduling period is a scheduling period next to a second scheduling period. Refer to FIG. 7B. Assuming that a current scheduling period is T0 and the second scheduling period is T1, a determination is made that the third scheduling period is T2, because the third scheduling period is a scheduling period next to the second scheduling period. Before aggregation scheduling is performed, there is to-be-received first uplink data data1 in the second scheduling period T1, and there is to-be-received uplink data data2 in the third scheduling period T2. After determining that the first uplink data data1 is scheduled from the second scheduling period T1 to the second scheduling period T2, a network device schedules the first uplink data data1 from the second scheduling period 1 to the third scheduling period T2. After the aggregation scheduling is completed, there is no to-be-received uplink data in the second scheduling period T1, and there are the to-be-received first uplink data data1 and the to-be-received uplink data data2 in the third scheduling period T2.

FIG. 7C is a schematic diagram of still another aggregation scheduling process according to an embodiment of this application. A third scheduling period is a scheduling period that follows a second scheduling period, has to-be-received uplink data, and is closest to the second scheduling period. Refer to FIG. 7C. Assuming that a current scheduling period is T0 and the second scheduling period is T1, with to-be-received uplink data in scheduling periods shown in FIG. 7C, a determination is made that the third scheduling period is T3, because the third scheduling period is a scheduling period that follows the second scheduling period, has to-be-received uplink data, and is closest to the second scheduling period. Before aggregation scheduling is performed, there is to-be-received first uplink data data1 in the second scheduling period T1, and there is to-be-received uplink data data2 in the third scheduling period T3. After determining that the first uplink data data1 is scheduled from the second scheduling period T1 to the third scheduling period T3, a network device schedules the first uplink data data1 from the second scheduling period T1 to the third scheduling period T3. After the aggregation scheduling is completed, there is no to-be-received uplink data in the second scheduling period T1, and there are the to-be-received first uplink data data1 and the to-be-received uplink data data2 in the third scheduling period T3.

In this implementation, aggregation scheduling is performed on the uplink data of a relatively low service priority, and when aggregation scheduling is performed, reference is made to the delay of the first uplink data and the amount of resources occupied by the first uplink data. Therefore, precise aggregation scheduling is performed on the first uplink data, preventing aggregation scheduling from causing excessive impact on a service delay. In addition, by using the foregoing method, aggregation scheduling is performed on uplink data that is in a plurality of scheduling periods, to increase scheduling periods that are in an idle state, so that the receive channel is turned off in more scheduling periods, thereby reducing power consumption of the receive channel and further reducing the power consumption of the network device.

In a multi-carrier single-mode scenario, aggregation scheduling is able to be performed on uplink data in the following two feasible implementations. The following uses a process of scheduling to-be-received uplink data that is on any receive channel as an example for description, and at least two carriers are configured for the receive channel. In other words, the following at least two carriers are carriers configured for the any receive channel.

In a feasible implementation:

The network device sets corresponding invalid scheduling periods for the at least two carriers. The invalid scheduling periods corresponding to the at least two carriers are in same time domain positions. When scheduling uplink data, the network device schedules the uplink data to a valid scheduling period for transmission. For example, the network device is able to schedule the uplink data to a valid scheduling period closest to a current moment for transmission.

Invalid scheduling periods and valid scheduling periods are set at intervals. The following describes possible scheduling period settings with reference to FIG. 8A to FIG. 8C.

Figure 8A:
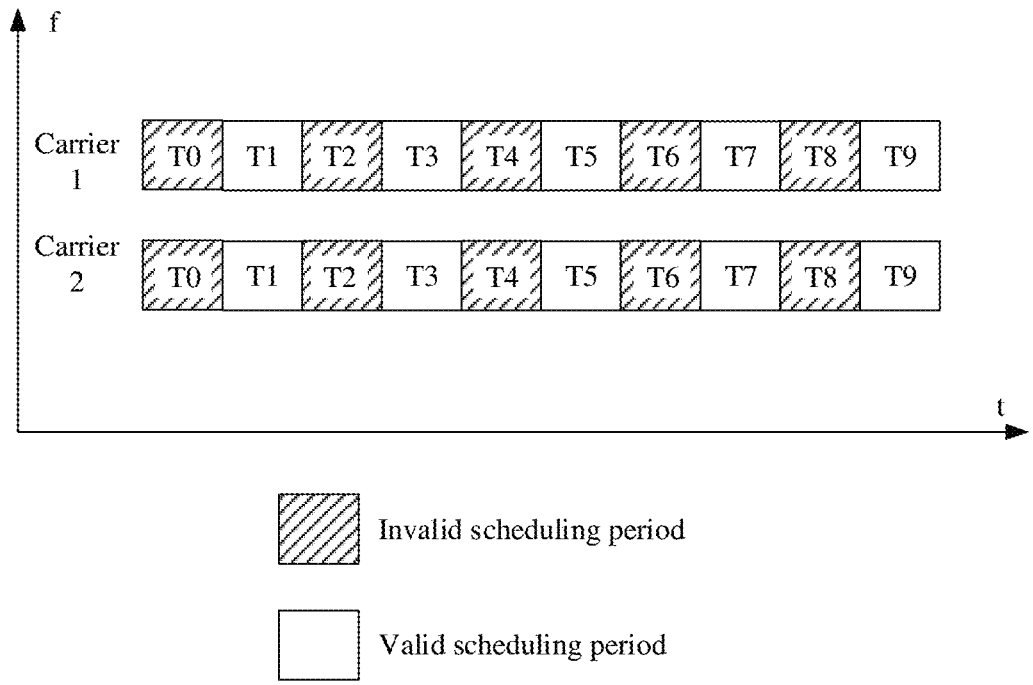
FIG. 8A is a schematic diagram of yet another scheduling period according to an embodiment of this application.

FIG. 8A is a schematic diagram of yet another scheduling period according to an embodiment of this application. Refer to FIG. 8A. Carriers configured for a receive channel include a carrier 1 and a carrier 2, and invalid scheduling periods corresponding to the carrier 1 and the carrier 2 are in same time domain positions. For example, T0$s$, T2$s$, T4$s$, T6$s$, and T8$s$ of the carrier 1 and the carrier 2 are invalid scheduling periods, and T1$s$, T3$s$, T5$s$, T7$s$, and T9$s$ of the carrier 1 and the carrier 2 are valid scheduling periods. The invalid scheduling periods and the valid scheduling periods are set at equal intervals. For example, when a terminal device has to-be-sent uplink data corresponding to the carrier 1 or the carrier 2 in the scheduling period T0, a network device schedules the uplink data to the scheduling period T1, and when the terminal device has to-be-sent uplink data corresponding to the carrier 1 or the carrier 2 in the scheduling period T2, the network device schedules the uplink data to the scheduling period T3.

Figure 8B:
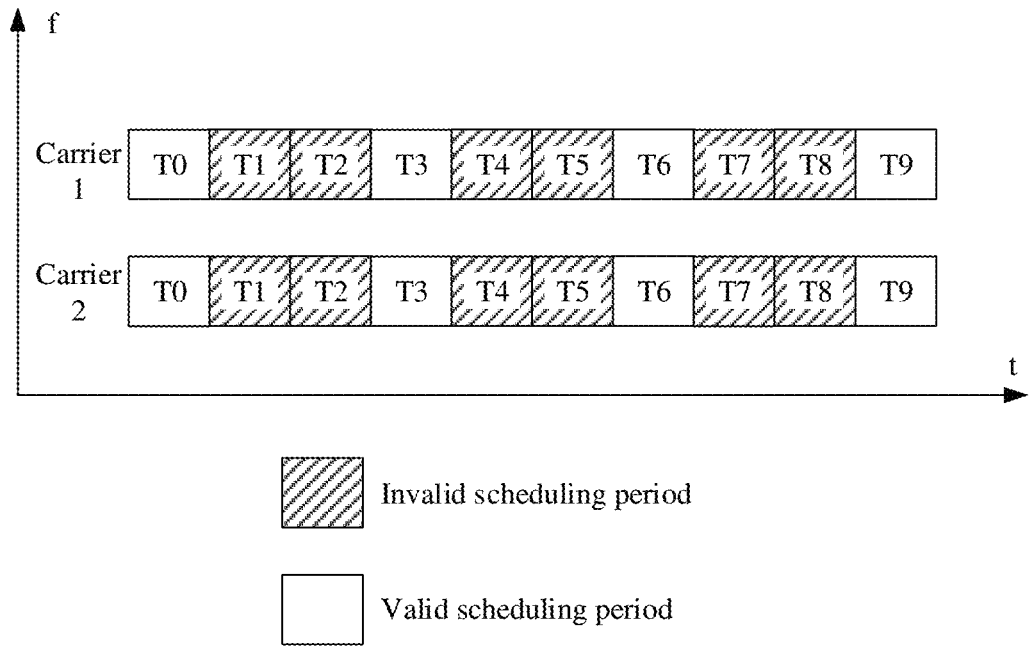
FIG. 8B is a schematic diagram of another scheduling period according to an embodiment of this application.

FIG. 8B is a schematic diagram of another scheduling period according to an embodiment of this application. Refer to FIG. 8B. Carriers configured for a receive channel include a carrier 1 and a carrier 2, and invalid scheduling periods corresponding to the carrier 1 and the carrier 2 are in same time domain positions. For example, T0$s$, T3$s$, T6$s$, and T9$s$ of the carrier 1 and the carrier 2 are invalid scheduling periods, and T1$s$, T2$s$, T4$s$, T5$s$, T7$s$, and T8$s$ of the carrier 1 and the carrier 2 are valid scheduling periods. The invalid scheduling periods and the valid scheduling periods are set at unequal intervals. For example, when a terminal device has to-be-sent uplink data corresponding to the carrier 1 or the carrier 2 in the scheduling period T1 or T2, a network device schedules the uplink data to the scheduling period T3, and when the terminal device has to-be-sent uplink data corresponding to the carrier 1 or the carrier 2 in the scheduling period T4 or T5, the network device schedules the uplink data to the scheduling period T6.

Figure 8C:
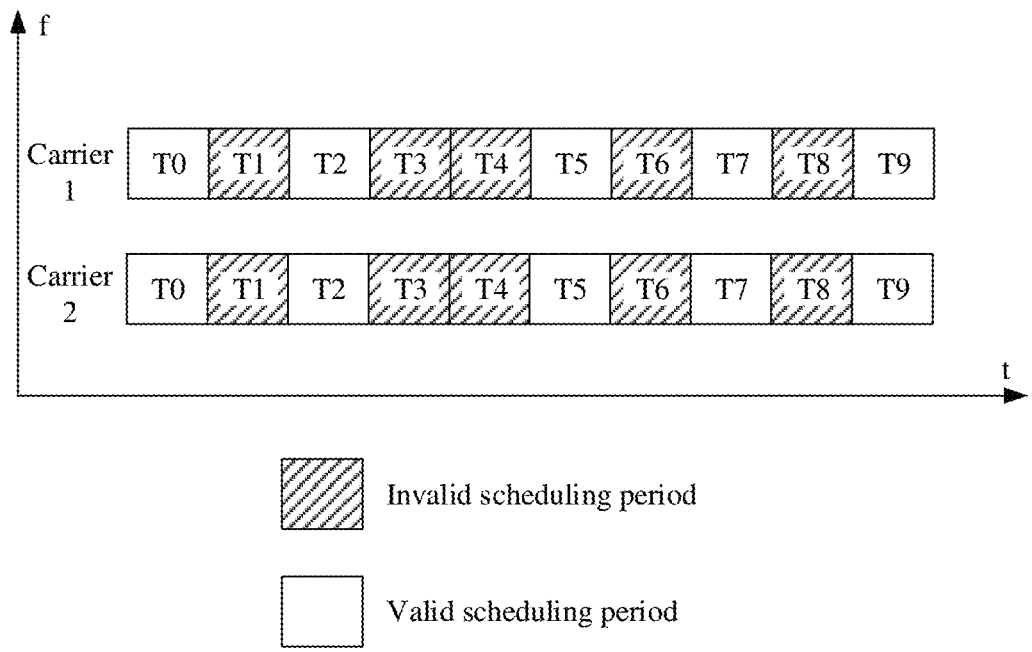
FIG. 8C is a schematic diagram of still another scheduling period according to an embodiment of this application.

FIG. 8C is a schematic diagram of still another scheduling period according to an embodiment of this application. Refer to FIG. 8C. Carriers configured for a receive channel include a carrier 1 and a carrier 2, and invalid scheduling periods corresponding to the carrier 1 and the carrier 2 are in same time domain positions. For example, T1$s$, T3$s$, T4$s$, T6$s$, and T8$s$ of the carrier 1 and the carrier 2 are invalid scheduling periods, and T0$s$, T2$s$, T5$s$, T7$s$, and T9$s$ of the carrier 1 and the carrier 2 are valid scheduling periods. The invalid scheduling periods and the valid scheduling periods are set at unequal intervals. For example, when a terminal device has to-be-sent uplink data corresponding to the carrier 1 or the carrier 2 in the scheduling period T1, a network device schedules the uplink data to the scheduling period T2, and when the terminal device has to-be-sent uplink data corresponding to the carrier 1 or the carrier 2 in the scheduling period T3 or T4, the network device schedules the uplink data to the scheduling period T5.

FIG. 8A to FIG. 8C illustrate setting of invalid scheduling periods and valid scheduling periods merely in a form of an example, and are not limitations on setting of invalid scheduling periods and valid scheduling periods. In an actual application process, valid scheduling periods and invalid scheduling periods are set according to an actual parameter. This is not limited in the embodiments of this application.

In this implementation, by setting invalid scheduling periods for the at least two carriers and ensuring that the invalid scheduling periods corresponding to the at least two carriers are in same time domain positions, aggregation scheduling is performed on uplink data that is in a plurality of scheduling periods, to increase scheduling periods that are in an idle state, so that the receive channel is turned off in more scheduling periods, thereby reducing power consumption of the receive channel and further reducing the power consumption of the network device.

In another feasible implementation:

The network device performs aggregation scheduling on uplink data that corresponds to at least one of the at least two carriers, to schedule uplink data that is in different scheduling periods on the at least two carriers to a same scheduling period. In other words, the network device performs aggregation scheduling on the uplink data that corresponds to the at least one of the at least two carriers, so that scheduling periods that correspond to the carriers and in which there is uplink data are as identical as possible.

Aggregation scheduling is able to be performed, in the following feasible implementation, on the uplink data that corresponds to the at least one of the at least two carriers: if uplink data that is in a fourth scheduling period on carriers in a first carrier set is delayed by one scheduling period, scheduling the uplink data that is in the fourth scheduling period on the carriers in the first carrier set to a scheduling period next to the fourth scheduling period, where the first carrier set includes carriers that are of the at least two carriers and on which there is uplink data in the fourth scheduling period.

When the following conditions are met, the uplink data that is in the fourth scheduling period on the carriers in the first carrier set is scheduled to the scheduling period next to the fourth scheduling period:

Condition 1: Service priorities corresponding to the uplink data that is in the fourth scheduling period on the carriers in the first carrier set are less than or equal to a preset service priority.

Condition 2: If the first carrier set has a carrier on which the uplink data in the fourth scheduling period has an initial transmission bearer, a priority of the initial transmission bearer is less than or equal to a preset bearer priority.

Condition 3: Delays, relative to the fourth scheduling period, of the uplink data that is in the fourth scheduling period on the carriers in the first carrier set are less than or equal to a preset delay. The delays of the uplink data relative to the fourth scheduling period are lengths of time between moments at which terminal devices request to send the uplink data and the fourth scheduling period.

Condition 4: A sum of a quantity of resources occupied by the uplink data that is in the fourth scheduling period on the carriers in the first carrier set, and a quantity of resources occupied by uplink data that is in the scheduling period next to the fourth scheduling period on the at least two carriers is less than or equal to a preset resource quantity.

The foregoing describes, merely in a form of an example, conditions used for determining that the first uplink data is delayed to the third scheduling period. In an actual application process, the conditions are set according to an actual parameter. This is not limited in the embodiments of this application.

In an actual application process, a plurality of logic processing units are disposed in the network device. The plurality of logic processing units is able to respectively schedule uplink data that corresponds to different carriers in the at least two carriers. Before scheduling the uplink data corresponding to the different carriers, the plurality of logic processing units is able to communicate with each other. For example, each logic processing unit is able to send corresponding uplink data information to another logic processing unit. The uplink data information is able to include one or more of whether there is uplink data in the fourth scheduling period on the carrier corresponding to the logic processing unit, a service priority corresponding to the uplink data, a priority of an initial transmission bearer, a delay relative to the fourth scheduling period, or a quantity of occupied resources. In this way, each logic processing unit is able to determine, based on received data, whether the foregoing four conditions is met.

Figure 9:
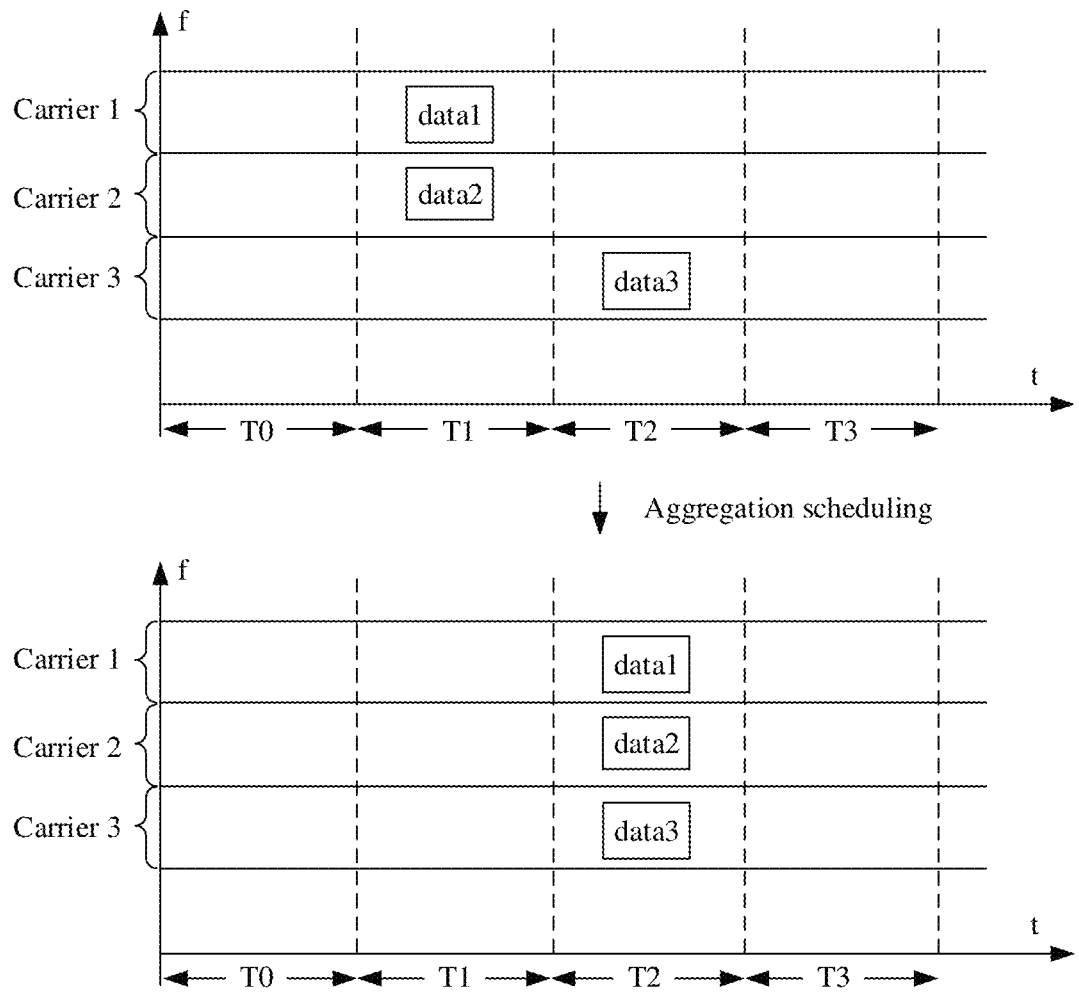
FIG. 9 is a schematic diagram of another aggregation scheduling process according to an embodiment of this application.

The following describes an aggregation scheduling process with reference to FIG. 9.

FIG. 9 is a schematic diagram of another aggregation scheduling process according to an embodiment of this application. Refer to FIG. 9. Carriers configured for a receive channel include a carrier 1, a carrier 2, and a carrier 3. Current scheduling period is T0. Before aggregation scheduling is performed, the carrier 1 has corresponding uplink data data1 in a scheduling period T1, the carrier 2 has corresponding uplink data data2 in the scheduling period T1, and the carrier 3 does not have corresponding uplink data in the scheduling period T1 but has corresponding uplink data data3 in a scheduling period T2. Assuming that a network device determines that the uplink data data1 and the uplink data data2 meet the foregoing four conditions, the network device is able to schedule the uplink data data1 and the uplink data data2 to the scheduling period T2. After aggregation scheduling is performed, there is no uplink data in the scheduling period T1, and there are the uplink data data1, the uplink data data2, and the uplink data data3 in the scheduling period 2.

In this implementation, aggregation scheduling is performed on the uplink data of a relatively low service priority, and when aggregation scheduling is performed, reference is made to the delay of the first uplink data and the amount of resources occupied by the first uplink data. Therefore, precise aggregation scheduling is performed on the first uplink data, preventing aggregation scheduling from causing excessive impact on a service delay. In addition, by using the foregoing method, aggregation scheduling is performed on uplink data that is in a plurality of scheduling periods, to increase scheduling periods that are in an idle state, so that the receive channel is turned off in more scheduling periods, thereby reducing power consumption of the receive channel and further reducing the power consumption of the network device.

In a multi-carrier multi-mode scenario, the network device is able to first update duration of a scheduling period of at least one of the at least two carriers. The updated duration of the scheduling periods corresponding to the at least two carriers is the same. Then, the network device schedules uplink data according to the technical solution shown in the multi-carrier single-mode scenario. Optionally, in the multi-carrier multi-mode scenario, duration of a scheduling period of a first carrier is able to be updated. The scheduling period of the first carrier is relatively short. For example, the at least two carriers include a carrier 1 and a carrier 2, a scheduling period of the carrier 1 is a scheduling period 1, a scheduling period of the carrier 2 is a scheduling period 2, and duration of the scheduling period 1 is N times duration of the scheduling period 2. In this case, the duration of the scheduling period 2 of the carrier 2 is able to be increased by N times, so that the updated duration of the scheduling period 2 is the same as the duration of the scheduling period 1.

Figure 10:
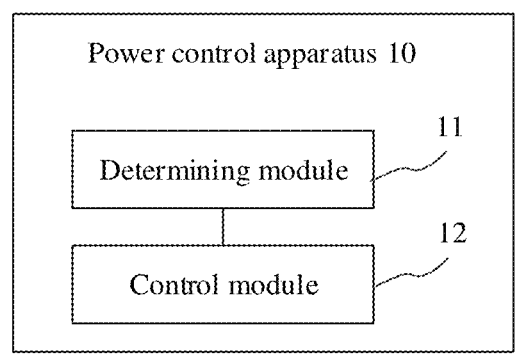
FIG. 10 is a schematic diagram of a structure of a power control apparatus according to an embodiment of this application.

FIG. 10 is a schematic diagram of a structure of a power control apparatus according to an embodiment of this application. The power control apparatus is located in a network device. Refer to FIG. 10. The power control apparatus 10 is able to include a determining module 11 and a control module 12.

The determining module 11 is configured to determine whether there is to-be-received uplink data in a first scheduling period on a first receive channel.

The control module 12 is configured to: when the determining module determines that there is no to-be-received uplink data in the first scheduling period on the first receive channel, control a state of the first receive channel in the first scheduling period to be an off state.

Optionally, the determining module 11 is able to perform S501 in the embodiment in FIG. 5, and the control module 12 is able to perform S502 and S503 in the embodiment in FIG. 5.

The power control apparatus provided in this embodiment of this application is able to perform the technical solutions shown in the foregoing method embodiments. Implementation principles and advantageous effects of the power control apparatus are similar to those in the method embodiments. Details are not described herein again.

In a possible implementation, the first receive channel includes a receive end and a low noise amplifier, and the control module 12 is configured to:
  before the first scheduling period starts, control the receive end and/or the low noise amplifier to be turned off.

Figure 11:
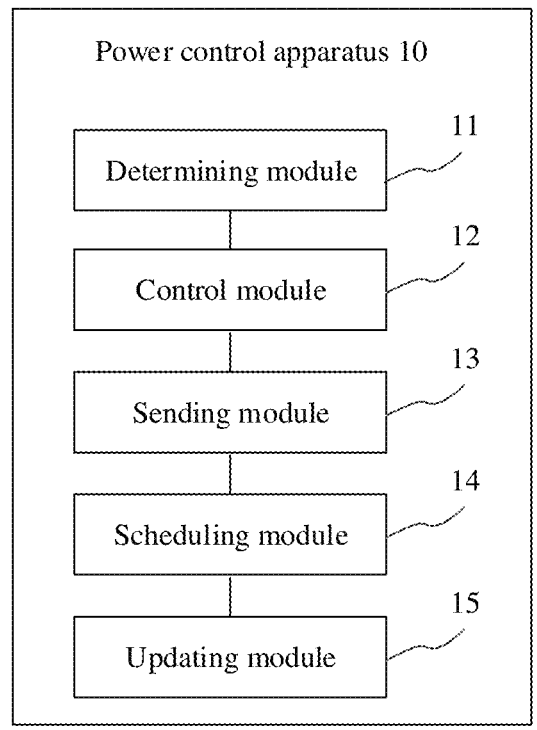
FIG. 11 is a schematic diagram of a structure of another power control apparatus according to an embodiment of this application.

FIG. 11 is a schematic diagram of a structure of another power control apparatus according to an embodiment of this application. The power control apparatus is located in a network device, and the network device is able to be a BBU. On a basis of the embodiment shown in FIG. 10, referring to FIG. 11, the power control apparatus 10 is able to further include a sending module 13, and
  the sending module 13 is configured to send first information to a processing chip, where the first information is used to indicate the processing chip to turn off the receive end and/or the low noise amplifier; or
  the sending module 13 is configured to send second information to the receive end and/or the low noise amplifier, where the second information is used to indicate the receive end and/or the low noise amplifier to set a state to an off state.

In a possible implementation, the apparatus further includes a scheduling module 14.

The scheduling module 14 is configured to: before the determining module 11 determines whether there is to-be-received uplink data in the first scheduling period on the first receive channel, perform aggregation scheduling on to-be-received uplink data that is on the first receive channel, where aggregation scheduling is used to schedule uplink data that is in at least one scheduling period to another scheduling period.

In a possible implementation, the first receive channel corresponds to a single carrier, and the scheduling module 14 is configured to:
  determine whether first uplink data in a second scheduling period on the single carrier is delayed to a third scheduling period; and
  if the first uplink data in the second scheduling period on the single carrier is delayed to the third scheduling period, schedule the first uplink data to the third scheduling period, where the third scheduling period follows the second scheduling period.

In a possible implementation, when the following conditions are met, the scheduling module 14 determines that the to-be-received first uplink data in the second scheduling period on the single carrier is delayed to the third scheduling period:
  a service priority corresponding to the first uplink data is less than or equal to a preset service priority;
  if there is an initial transmission bearer in the first uplink data, a priority of the initial transmission bearer is less than or equal to a preset bearer priority;
  a delay of the first uplink data relative to the third scheduling period is less than or equal to a preset delay; and
  a sum of a quantity of resources occupied by the first uplink data and a quantity of resources occupied by uplink data that is in the third scheduling period on the single carrier is less than or equal to a preset resource quantity.

In a possible implementation, the third scheduling period is adjacent to the second scheduling period; or
  there is to-be-received second uplink data in the third scheduling period.

In a possible implementation, the first receive channel corresponds to at least two carriers, and the scheduling module 14 is configured to:
  perform aggregation scheduling on uplink data that corresponds to at least one of the at least two carriers, where aggregation scheduling is used to schedule uplink data that is in different scheduling periods on the at least two carriers to a same scheduling period.

In a possible implementation, the scheduling module 14 is configured to:
  if uplink data that is in a fourth scheduling period on carriers in a first carrier set is delayed by one scheduling period, schedule the uplink data that is in the fourth scheduling period on the carriers in the first carrier set to a scheduling period next to the fourth scheduling period, where
  the first carrier set includes carriers that are of the at least two carriers and on which there is uplink data in the fourth scheduling period.

In a possible implementation, when the following conditions are met, the scheduling module 14 schedules the uplink data that is in the fourth scheduling period on the carriers in the first carrier set to the scheduling period next to the fourth scheduling period:
  service priorities corresponding to the uplink data that is in the fourth scheduling period on the carriers in the first carrier set are less than or equal to a preset service priority;
  if the first carrier set has a carrier on which the uplink data in the fourth scheduling period has an initial transmission bearer, a priority of the initial transmission bearer is less than or equal to a preset bearer priority;

delays, relative to the fourth scheduling period, of the uplink data that is in the fourth scheduling period on the carriers in the first carrier set are less than or equal to a preset delay; and a sum of a quantity of resources occupied by the uplink data that is in the fourth scheduling period on the carriers in the first carrier set, and a quantity of resources occupied by uplink data that is in the scheduling period next to the fourth scheduling period on the at least two carriers is less than or equal to a preset resource quantity.

In a possible implementation, the first receive channel corresponds to at least two carriers, and invalid scheduling periods corresponding to the at least two carriers are in same time domain positions, where the invalid scheduling period is a scheduling period in which uplink data transmission is not performed.

In a possible implementation, the power control apparatus 10 is able to further include an updating module 15.

The updating module 15 is configured to: when scheduling periods corresponding to the at least two carriers are of different duration, update duration of a scheduling period of at least one of the at least two carriers, where the updated duration of the scheduling periods corresponding to the at least two carriers is the same, and the first receive channel corresponds to at least two carriers.

The power control apparatus provided in this embodiment of this application is able to perform the technical solutions shown in the foregoing method embodiments. Implementation principles and advantageous effects of the power control apparatus are similar to those in the method embodiments. Details are not described herein again.

Figure 12:
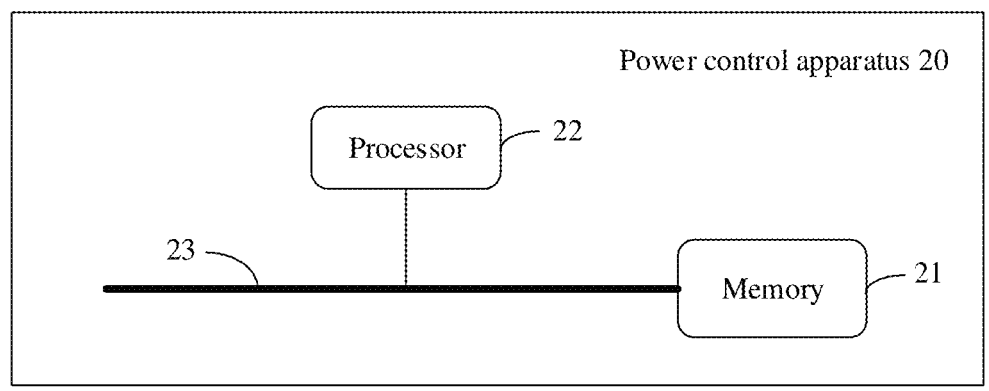
FIG. 12 is a schematic diagram of a structure of still another power control apparatus according to an embodiment of this application.

FIG. 12 is a schematic diagram of a structure of still another power control apparatus according to an embodiment of this application. The power control apparatus is applied to a network device. Refer to FIG. 12. The power control apparatus 20 is able to include a memory 21 and a processor 22. For example, the processor 22 and the memory 21 communicate through a communication bus 23. The memory 21 stores program instructions, and the processor 22 executes the program instructions in the memory 21 and performs the following steps:

determining whether there is to-be-received uplink data in a first scheduling period on a first receive channel; and if determining that there is no to-be-received uplink data in the first scheduling period on the first receive channel, controlling a state of the first receive channel in the first scheduling period to be an off state.

Optionally, the processor 22 in this embodiment of this application is able to have functions of the determining module and the control module in the embodiments in FIG. 10 and FIG. 11.

The power control apparatus shown in this embodiment of this application is able to perform the technical solutions shown in the foregoing method embodiments. Implementation principles and beneficial effects of the power control apparatus 20 are similar to those in the method embodiments. Details are not described herein again.

In a possible implementation, the first receive channel includes a receive end and a low noise amplifier, and the processor 22 is configured to:

before the first scheduling period starts, control the receive end and/or the low noise amplifier to be turned off.

Figure 13:
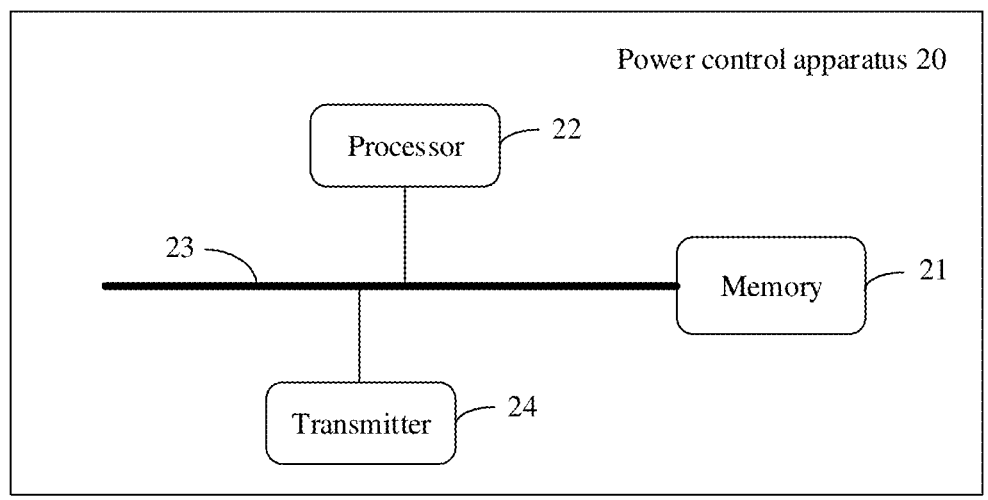
FIG. 13 is a schematic diagram of a structure of yet another power control apparatus according to an embodiment of this application.

FIG. 13 is a schematic diagram of a structure of yet another power control apparatus according to an embodiment of this application. A network device is a BBU. On a basis of the embodiment shown in FIG. 12, referring to FIG. 13, the power control apparatus 20 is able to further include a transmitter 24, and the transmitter 24 is configured to send first information to a processing chip, where the first information is used to indicate the processing chip to turn off the receive end and/or the low noise amplifier; or the transmitter 24 is configured to send second information to the receive end and/or the low noise amplifier, where the second information is used to indicate the receive end and/or the low noise amplifier to set a state to an off state.

In a possible implementation, the processor 22 is further configured to: before the processor 22 determines whether there is to-be-received uplink data in the first scheduling period on the first receive channel, perform aggregation scheduling on to-be-received uplink data that is on the first receive channel, where aggregation scheduling is used to schedule uplink data that is in at least one scheduling period to another scheduling period.

In a possible implementation, the first receive channel corresponds to a single carrier, and the processor 22 is configured to:

determine whether first uplink data in a second scheduling period on the single carrier is delayed to a third scheduling period; and if the first uplink data in the second scheduling period on the single carrier is delayed to the third scheduling period, schedule the first uplink data to the third scheduling period, where the third scheduling period follows the second scheduling period.

In a possible implementation, when the following conditions are met, the processor 22 determines that the to-be-received first uplink data in the second scheduling period on the single carrier is delayed to the third scheduling period:

a service priority corresponding to the first uplink data is less than or equal to a preset service priority;

if there is an initial transmission bearer in the first uplink data, a priority of the initial transmission bearer is less than or equal to a preset bearer priority;

a delay of the first uplink data relative to the third scheduling period is less than or equal to a preset delay; and a sum of a quantity of resources occupied by the first uplink data and a quantity of resources occupied by uplink data that is in the third scheduling period on the single carrier is less than or equal to a preset resource quantity.

In a possible implementation, the third scheduling period is adjacent to the second scheduling period; or there is to-be-received second uplink data in the third scheduling period.

In a possible implementation, the first receive channel corresponds to at least two carriers, and the processor 22 is configured to:

perform aggregation scheduling on uplink data that corresponds to at least one of the at least two carriers, where aggregation scheduling is used to schedule uplink data that is in different scheduling periods on the at least two carriers to a same scheduling period.

In a possible implementation, the processor 22 is configured to:

if uplink data that is in a fourth scheduling period on carriers in a first carrier set is delayed by one scheduling period, schedule the uplink data that is in the fourth scheduling period on the carriers in the first carrier set to a scheduling period next to the fourth scheduling period, where the first carrier set includes carriers that are of the at least two carriers and on which there is uplink data in the fourth scheduling period.

In a possible implementation, when the following conditions are met, the processor 22 schedules the uplink data that is in the fourth scheduling period on the carriers in the first carrier set to the scheduling period next to the fourth scheduling period:

service priorities corresponding to the uplink data that is in the fourth scheduling period on the carriers in the first carrier set are less than or equal to a preset service priority;

if the first carrier set has a carrier on which the uplink data in the fourth scheduling period has an initial transmission bearer, a priority of the initial transmission bearer is less than or equal to a preset bearer priority;

delays, relative to the fourth scheduling period, of the uplink data that is in the fourth scheduling period on the carriers in the first carrier set are less than or equal to a preset delay; and a sum of a quantity of resources occupied by the uplink data that is in the fourth scheduling period on the carriers in the first carrier set, and a quantity of resources occupied by uplink data that is in the scheduling period next to the fourth scheduling period on the at least two carriers is less than or equal to a preset resource quantity.

In a possible implementation, the first receive channel corresponds to at least two carriers, and invalid scheduling periods corresponding to the at least two carriers are in same time domain positions, where the invalid scheduling period is a scheduling period in which uplink data transmission is not performed.

In a possible implementation, the first receive channel corresponds to at least two carriers, and when scheduling periods corresponding to the at least two carriers are of different duration, the processor 22 is further configured to update duration of a scheduling period of at least one of the at least two carriers, where the updated duration of the scheduling periods corresponding to the at least two carriers is the same.

The power control apparatus shown in this embodiment of this application is able to perform the technical solutions shown in the foregoing method embodiments. Implementation principles and beneficial effects of the power control apparatus 20 are similar to those in the method embodiments. Details are not described herein again.

Optionally, the processor is able to be a central processing unit (Central Processing Unit, CPU), or is able to be another general purpose processor, a digital signal processor (Digital Signal Processor, DSP), an application-specific integrated circuit (Application-Specific Integrated Circuit, ASIC), or the like. The general-purpose processor is able to be a microprocessor, or the processor is able to be any conventional processor, or the like. The steps in the service processing method embodiments disclosed with reference to this application is able to be directly performed and completed by a hardware processor, or is able to be performed and completed by using a combination of hardware in the processor and a software module.

An embodiment of this application provides a network device. The network device is able to include the power control apparatus 20 shown in FIG. 11 and FIG. 12. Optionally, when a structure of the network device is shown in FIG. 1A and FIG. 1B, the power control apparatus 20 is able to be disposed in a BBU.

An embodiment of this application provides a storage medium. The storage medium is configured to store a computer program. The computer program is used to implement the power control method described in the foregoing embodiments.

An embodiment of this application provides a computer program product. The computer program product includes instructions, and when the instructions are executed, a computer is enabled to perform the foregoing power control method.

An embodiment of this application provides a system on chip or a system chip. The system on chip or the system chip is able to be used in a terminal device, and the system on chip or the system chip includes at least one communication interface, at least one processor, and at least one memory. The communication interface, the memory, and the processor are interconnected by using a bus, and the processor executes instructions stored in the memory, so that the terminal device is able to perform the power control method.

All or some of the steps in the method embodiments are implemented by hardware related to program instructions. The foregoing program is able to be stored in a computer-readable memory. When the program is executed, the steps in the foregoing method embodiments are performed. The foregoing memory (storage medium) includes a read-only memory (English: read-only memory, ROM for short), a RAM, a flash memory, a hard disk drive, a solid-state drive, a magnetic tape (English: magnetic tape), a floppy disk (English: floppy disk), an optical disc (English: optical disc), and any combination thereof.

Embodiments of this application are described with reference to the flowcharts and/or block diagrams of the method, the device (system), and the computer program product according to embodiments of this application. Computer program instructions are used to implement each process and/or each block in the flowcharts and/or the block diagrams and a combination of a process and/or a block in the flowcharts and/or the block diagrams. These computer program instructions are provided for a general-purpose computer, a dedicated computer, an embedded processor, or a processing unit of another programmable data processing device to generate a machine, so that instructions executed by the computer or the processing unit of the another programmable data processing device generate an apparatus for implementing a specific function in one or more processes in the flowcharts and/or in one or more blocks in the block diagrams.

These computer program instructions are stored in a computer-readable memory that is able to indicate the computer or another programmable data processing device to work in a specific manner, so that the instructions stored in the computer-readable memory generate an artifact that includes an instruction apparatus. The instruction apparatus implements the specific function in one or more processes in the flowcharts and/or in one or more blocks in the block diagrams.

These computer program instructions is able to alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specified function in one or more processes in the flowcharts and/or in one or more blocks in the block diagrams.

A person skilled in the art is able to make various modifications and variations to embodiments of this application without departing from the spirit and scope of this application. In this way, this application is intended to cover these modifications and variations of embodiments of this application provided that these modifications and variations fall within the scope of protection defined by the following claims and equivalent technologies.

In this application, the term "include" and variations thereof is able to mean non-limitative inclusion; and the term "or" and variations thereof is able to mean "and/or". In this application, the terms "first", "second", and the like are intended to distinguish between similar objects but do not indicate a specific order or sequence. In this application, "a plurality of" means two or more than two. "And/or" describes an association relationship between associated objects and represents that three relationships is able to exist. For example, A and/or B is able to represent three cases: There is A, there are both A and B, and there is B. The character "/" generally represents an "or" relationship between the associated objects.

What is claimed is:

1. A power control method, comprising:
   determining, by a network device, whether there is a to-be-received uplink data in a first scheduling period on a first receive channel; and
   in response to determining that the to-be-received uplink data is not in the first scheduling period on the first receive channel, controlling, by the network device, a state of the first receive channel in the first scheduling period to be an off state, wherein
   the first receive channel comprises a receive end and a low noise amplifier, and the controlling, by the network device, the state of the first receive channel in the first scheduling period to be the off state comprises:
      before the first scheduling period starts, controlling, by the network device, the receive end and/or the low noise amplifier to be turned off.

2. The method according to claim 1, wherein the controlling, by the network device, the state of the first receive channel in the first scheduling period to be the off state comprises:
   before the first scheduling period starts, controlling, by the network device, the receive end and the low noise amplifier to be turned off.

3. The method according to claim 1, wherein the network device is a baseband unit (BBU), and the controlling, by the network device, the receive end and/or the low noise amplifier to be turned off comprises:
   sending, by the BBU, first information to a processing chip, wherein the first information is used to indicate the processing chip to turn off the receive end and/or the low noise amplifier; or
   sending, by the BBU, second information to the receive end and/or the low noise amplifier, wherein the second information is used to indicate the receive end and/or the low noise amplifier to the off state.

4. The method according to claim 1, before the determining, by the network device, whether there is the to-be-received uplink data in the first scheduling period on the first receive channel, further comprising:
   performing, by the network device, aggregation scheduling on the to-be-received uplink data that is on the first receive channel, wherein the aggregation scheduling is used to schedule uplink data that is in at least one scheduling period to another scheduling period.

5. The method according to claim 4, wherein the first receive channel corresponds to a single carrier, and the performing, by the network device, the aggregation scheduling on the to-be-received uplink data that is on the first receive channel comprises:
   determining, by the network device, whether first uplink data in a second scheduling period on the single carrier is allowed to be delayed to a third scheduling period; and
   in response to the first uplink data in the second scheduling period on the single carrier is allowed to be delayed to the third scheduling period, scheduling, by the network device, the first uplink data to the third scheduling period, wherein the third scheduling period follows the second scheduling period.

6. The method according to claim 5, wherein:
   determining that a to-be-received first uplink data in the second scheduling period on the single carrier is allowed to be delayed to the third scheduling period in response to the following conditions being met:
      a service priority corresponding to the first uplink data is less than or equal to a preset service priority;
      in response to there being an initial transmission bearer in the first uplink data, a priority of the initial transmission bearer is less than or equal to a preset bearer priority;
      a delay of the first uplink data relative to the third scheduling period is less than or equal to a preset delay; and
      a sum of a quantity of resources occupied by the first uplink data and a quantity of resources occupied by uplink data that is in the third scheduling period on the single carrier is less than or equal to a preset resource quantity.

7. The method according to claim 5, wherein
   the third scheduling period is adjacent to the second scheduling period; or
   there is to-be-received second uplink data in the third scheduling period.

8. The method according to claim 4, wherein the first receive channel corresponds to at least two carriers, and the performing, by the network device, the aggregation scheduling on the to-be-received uplink data corresponding to the first receive channel comprises:
   performing, by the network device, the aggregation scheduling on uplink data that corresponds to at least one of the at least two carriers, wherein the aggregation scheduling is used to schedule uplink data that is in different scheduling periods on the at least two carriers to a same scheduling period.

9. The method according to claim 8, wherein the performing, by the network device, the aggregation scheduling on uplink data that corresponds to at least one of the at least two carriers comprises:
   in response to uplink data that is in a fourth scheduling period on carriers in a first carrier set is allowed to be delayed by one scheduling period, scheduling the uplink data that is in the fourth scheduling period on the carriers in the first carrier set to a scheduling period next to the fourth scheduling period, wherein
   the first carrier set comprises carriers that are of the at least two carriers and on which there is the uplink data in the fourth scheduling period.

10. The method according to claim 9, wherein:
the uplink data that is in the fourth scheduling period on the carriers in the first carrier set is scheduled to the scheduling period next to the fourth scheduling period in response to the following conditions being met:
service priorities corresponding to the uplink data that is in the fourth scheduling period on the carriers in the first carrier set are less than or equal to a preset service priority;
in response to the first carrier set has a carrier on which the uplink data in the fourth scheduling period has an initial transmission bearer, a priority of the initial transmission bearer is less than or equal to a preset bearer priority;
delays, relative to the fourth scheduling period, of the uplink data that is in the fourth scheduling period on the carriers in the first carrier set are less than or equal to a preset delay; and
a sum of a quantity of resources occupied by the uplink data that is in the fourth scheduling period on the carriers in the first carrier set, and a quantity of resources occupied by uplink data that is in the scheduling period next to the fourth scheduling period on the at least two carriers is less than or equal to a preset resource quantity.

11. The method according to claim 1, wherein the first receive channel corresponds to at least two carriers, and invalid scheduling periods corresponding to the at least two carriers are in same time domain positions, wherein the invalid scheduling period is a scheduling period in which uplink data transmission is not performed.

12. The method according to claim 1, wherein the first receive channel corresponds to at least two carriers, and when scheduling periods corresponding to the at least two carriers are of different duration, the method further comprises:
updating duration of a scheduling period of at least one of the at least two carriers, wherein the updated duration of the scheduling periods corresponding to the at least two carriers is the same.

13. A power control apparatus in a network device, comprising:
a processor; and
a memory coupled to the processor, the memory comprising instructions that, when executed by the processor, cause the power control apparatus to:
determine whether there is a to-be-received uplink data in a first scheduling period on a first receive channel; and
in response to the power control apparatus determining the to-be-received uplink data is not in the first scheduling period on the first receive channel, control a state of the first receive channel in the first scheduling period to be an off state, wherein
the first receive channel comprises a receive end and a low noise amplifier, and the instructions, when executed by the processor, cause the power control apparatus to:
before the first scheduling period starts, control the receive end and/or the low noise amplifier to be turned off.

14. The power control apparatus according to claim 13, wherein the instructions, when executed by the processor, cause the power control apparatus to:
before the first scheduling period starts, control the receive end and the low noise amplifier to be turned off.

15. The power control apparatus according to claim 13, wherein the network device is a baseband unit (BBU), and the instructions, when executed by the processor, cause the power control apparatus to:
send first information to a processing chip, wherein the first information is used to indicate the processing chip to turn off the receive end and/or the low noise amplifier; or
send second information to the receive end and/or the low noise amplifier, wherein the second information is used to indicate the receive end and/or the low noise amplifier to the off state.

16. The power control apparatus according to claim 13, wherein the instructions, when executed by the processor, cause the power control apparatus to:
before the power control apparatus determines whether the to-be-received uplink data is in the first scheduling period on the first receive channel, perform aggregation scheduling on the to-be-received uplink data that is on the first receive channel, wherein the aggregation scheduling is used to schedule uplink data that is in at least one scheduling period to another scheduling period.

17. The power control apparatus according to claim 16, wherein the first receive channel corresponds to a single carrier, and the instructions, when executed by the processor, cause the power control apparatus to:
determine whether first uplink data in a second scheduling period on the single carrier is allowed to be delayed to a third scheduling period; and
in response to the first uplink data in the second scheduling period on the single carrier is allowed to be delayed to the third scheduling period, schedule the first uplink data to the third scheduling period, wherein the third scheduling period follows the second scheduling period.

18. The power control apparatus according to claim 16, wherein the first receive channel corresponds to at least two carriers, and the instructions, when executed by the processor, cause the power control apparatus to:
perform the aggregation scheduling on uplink data that corresponds to at least one of the at least two carriers, wherein the aggregation scheduling is used to schedule uplink data that is in different scheduling periods on the at least two carriers to a same scheduling period.

19. The power control apparatus according to claim 18, wherein the instructions, when executed by the processor, cause the power control apparatus to:
in response to uplink data that is in a fourth scheduling period on carriers in a first carrier set is allowed to be delayed by one scheduling period, schedule the uplink data that is in the fourth scheduling period on the carriers in the first carrier set to a scheduling period next to the fourth scheduling period, wherein
the first carrier set comprises carriers that are of the at least two carriers and on which there is the uplink data in the fourth scheduling period.

20. A computer-readable storage medium configured to store instructions that in response to the instructions being executed by a computer or processor, cause the computer or the processor to implement a power control method, the method comprising:
determining, by a network device, whether there is a to-be-received uplink data in a first scheduling period on a first receive channel; and
in response to determining that the to-be-received uplink data is not in the first scheduling period on the first receive channel, controlling, by the network device, a state of the first receive channel in the first scheduling period to be an off state, wherein the first receive channel comprises a receive end and a low noise amplifier, and the controlling, by the network device, the state of the first receive channel in the first scheduling period to be the off state comprises:

before the first scheduling period starts, controlling, by the network device, the receive end and/or the low noise amplifier to be turned off.

* * * * *